United States Patent
Washizu et al.

(10) Patent No.: US 11,042,819 B2
(45) Date of Patent: Jun. 22, 2021

(54) SERVER, CLIENT, AND INFORMATION SHARING SYSTEM

(71) Applicant: HONDA MOTOR CO., LTD., Tokyo (JP)

(72) Inventors: Masahiro Washizu, Tokyo (JP); Yusuke Hamano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 471 days.

(21) Appl. No.: 15/040,070

(22) Filed: Feb. 10, 2016

(65) Prior Publication Data
US 2016/0253603 A1    Sep. 1, 2016

(30) Foreign Application Priority Data

Feb. 27, 2015 (JP) .............................. JP2015-038679
Feb. 27, 2015 (JP) .............................. JP2015-038680
Feb. 27, 2015 (JP) .............................. JP2015-038681

(51) Int. Cl.
  *G06Q 10/02* (2012.01)
  *H04W 4/08* (2009.01)
  *H04W 4/024* (2018.01)

(52) U.S. Cl.
  CPC .......... *G06Q 10/025* (2013.01); *H04W 4/024* (2018.02); *H04W 4/08* (2013.01)

(58) Field of Classification Search
  CPC ......... G06Q 10/025; H04W 4/02; H04W 4/08
  See application file for complete search history.

(56) References Cited

U.S. PATENT DOCUMENTS

2005/0113123 A1    5/2005 Torvinen
2006/0069770 A1*   3/2006 Stienhans ............... H04L 51/14
                                              709/224
(Continued)

FOREIGN PATENT DOCUMENTS

JP       2000-010475 A    1/2000
JP       2002-351862 A    12/2002
(Continued)

OTHER PUBLICATIONS

Morris, Meredith Ringel & Horvitz, Eric. "SearchTogether: an interface for collaborative web search". 2007. In Proceedings of the 20th annual ACM symposium on User interface software and technology (UIST '07). Association for Computing Machinery, New York, NY, USA, pp. 3-12 (Year: 2007).*

(Continued)

*Primary Examiner* — George Chen
*Assistant Examiner* — Wayne S. Murray
(74) *Attorney, Agent, or Firm* — Squire Patton Boggs (US) LLP

(57) ABSTRACT

A system, etc. capable of facilitating communication about a travel in which a plurality of members participate are provided. Based on communication with a first client (2a), a server (1) recognizes a plan which is determined by a departure place, a stopover, a destination, and a route and is about a first group to which a first user belongs. Based on communication with a second client (2b) of a second user belonging to the first group as a belonging-target group registered in a database (14), the second client (2b) is caused to display icons representing the departure place, the stopover, and the destination and the route included in the plan.

16 Claims, 26 Drawing Sheets

(56) References Cited

U.S. PATENT DOCUMENTS

| | | | | |
|---|---|---|---|---|
| 2010/0268570 | A1* | 10/2010 | Rodriguez | G06Q 10/025 705/7.13 |
| 2011/0137995 | A1* | 6/2011 | Stewart | H04L 67/18 709/205 |
| 2011/0246581 | A1* | 10/2011 | Zhu | H04L 67/24 709/206 |
| 2013/0017846 | A1* | 1/2013 | Schoppe | H04M 1/72552 455/466 |
| 2014/0113674 | A1 | 4/2014 | Joseph et al. | |
| 2014/0240440 | A1* | 8/2014 | Seo | H04M 1/7253 348/14.03 |
| 2015/0163256 | A1* | 6/2015 | Frank | H04W 4/08 715/753 |
| 2015/0381548 | A1* | 12/2015 | Plotkin | G06Q 10/109 709/206 |
| 2018/0337800 | A1 | 11/2018 | Ichijo et al. | |

FOREIGN PATENT DOCUMENTS

| | | |
|---|---|---|
| JP | 2002-354121 A | 12/2002 |
| JP | 2002-357445 A | 12/2002 |
| JP | 2004-163179 A | 6/2004 |
| JP | 2004177999 A | 6/2004 |
| JP | 2005-127994 A | 5/2005 |
| JP | 2005-181258 A | 7/2005 |
| JP | 2006-162503 A | 6/2006 |
| JP | 2006-276380 A | 10/2006 |
| JP | 2006-332830 A | 12/2006 |
| JP | 2008-224520 A | 9/2008 |
| JP | 2010-028322 A | 2/2010 |
| JP | 2013-115589 A | 6/2013 |
| JP | 2013-124925 A | 6/2013 |
| JP | 2013-181956 A | 9/2013 |
| JP | 2013-200697 A | 10/2013 |
| JP | 2013-210979 A | 10/2013 |
| JP | 2014-137706 A | 7/2014 |
| JP | 2014-170524 A | 9/2014 |
| JP | 2014-236493 A | 12/2014 |
| WO | 2011/013796 A1 | 2/2011 |
| WO | 2011/142238 A1 | 11/2011 |

OTHER PUBLICATIONS

Japanese Office Action application No. 2015-038680 dated Aug. 2, 2016.

Japanese Office Action application No. 2015-038678 dated Oct. 11, 2016.

Japanese Office Action application No. 2015-038681 dated Oct. 18, 2016.

Japanese Office Action application No. 2015-038679 dated Oct. 25, 2016.

Japanese Office Action application No. JP2015-038680 dated Feb. 21, 2017.

Japanese Office Action International Application No. 2015-038680 dated Sep. 12, 2017.

May 2, 2018 Office Action issued in U.S. Appl. No. 15/050,727.

U.S. Office Action issued in corresponding U.S. Appl. No. 15/050,727 dated Dec. 11, 2018.

* cited by examiner

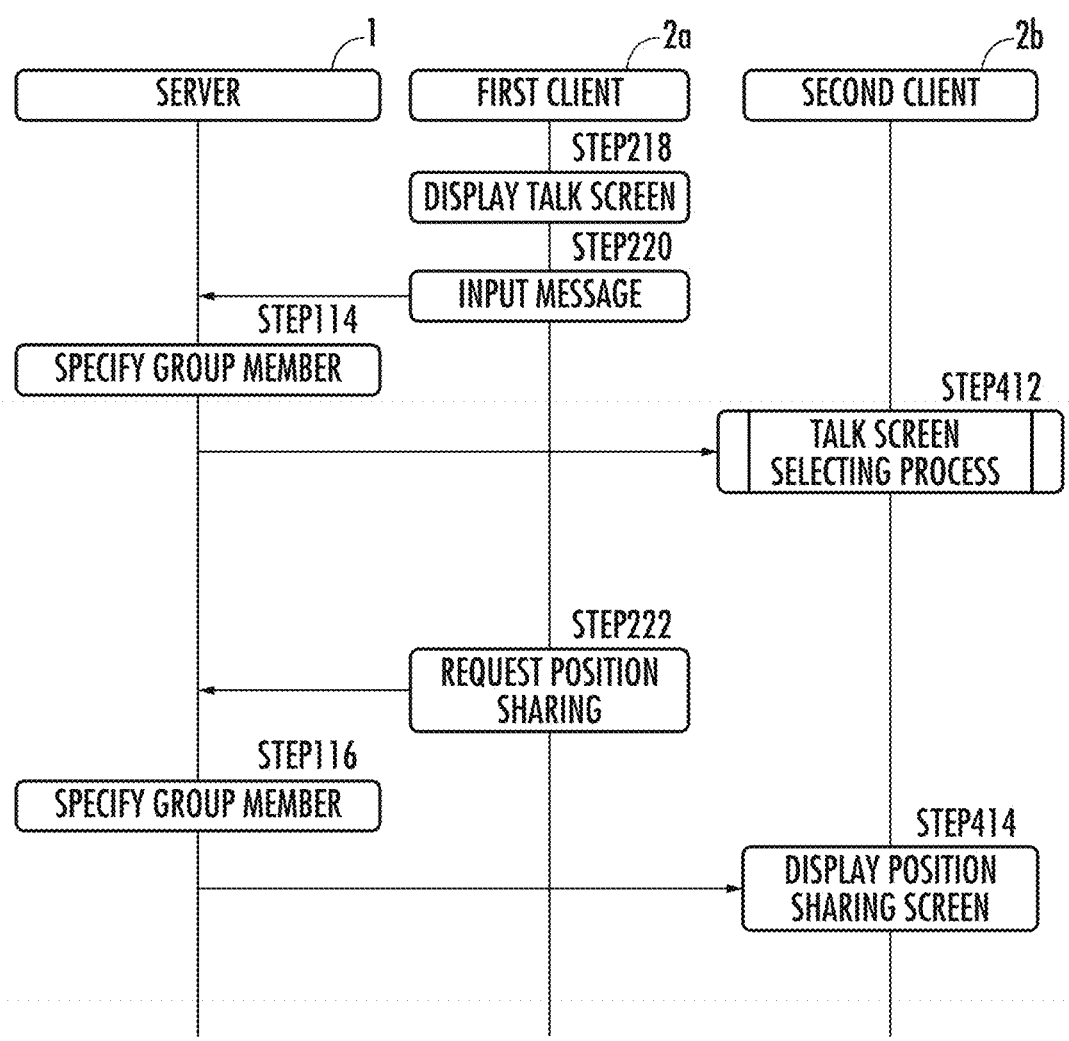

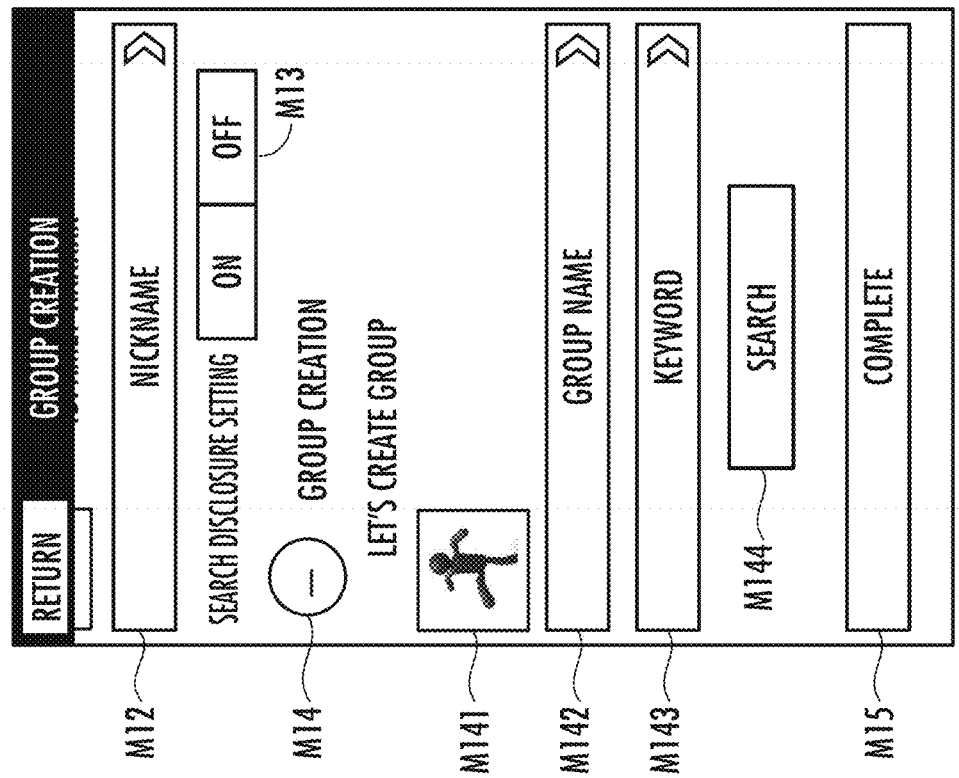
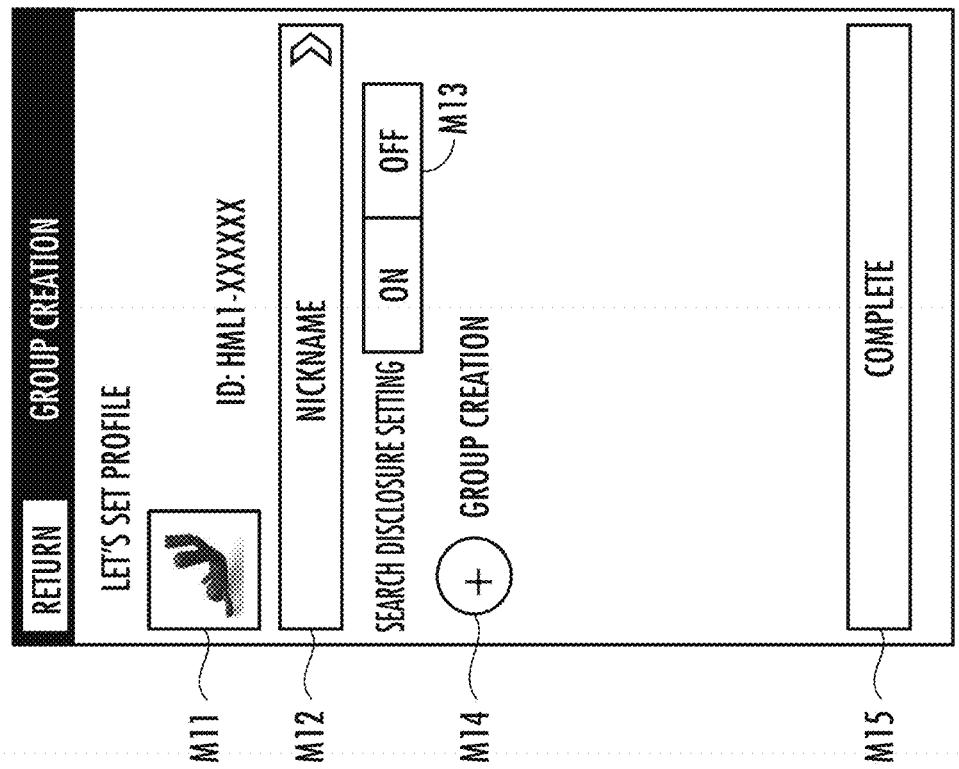

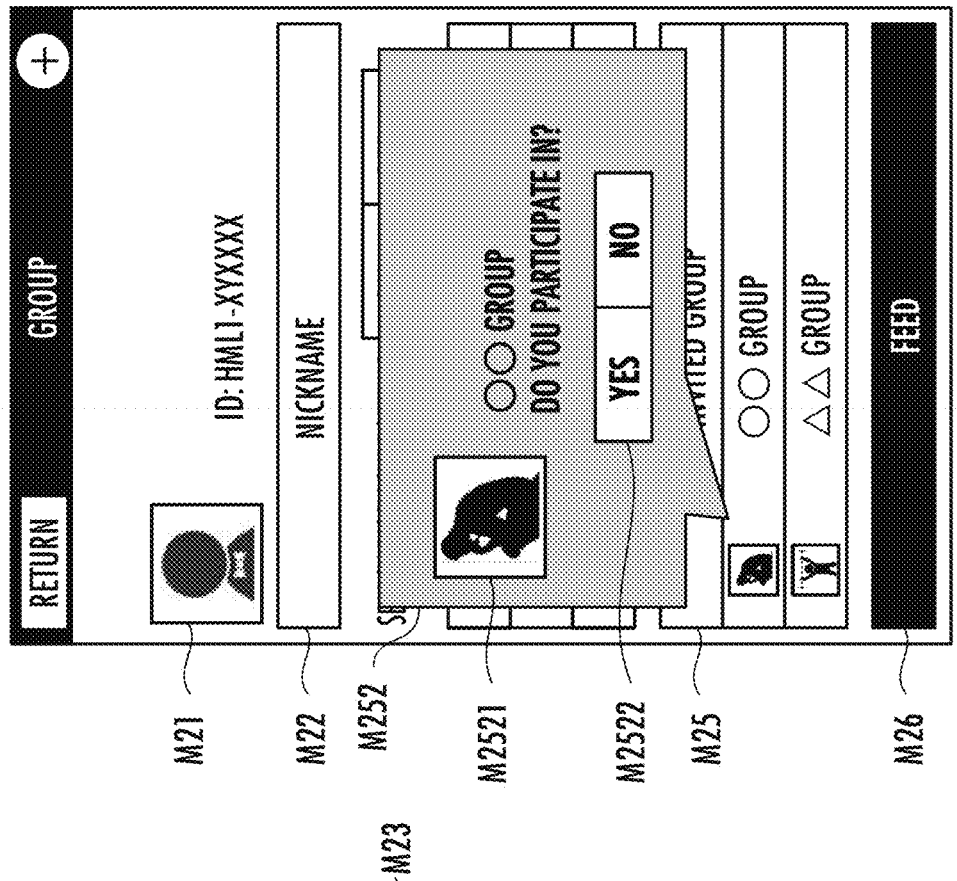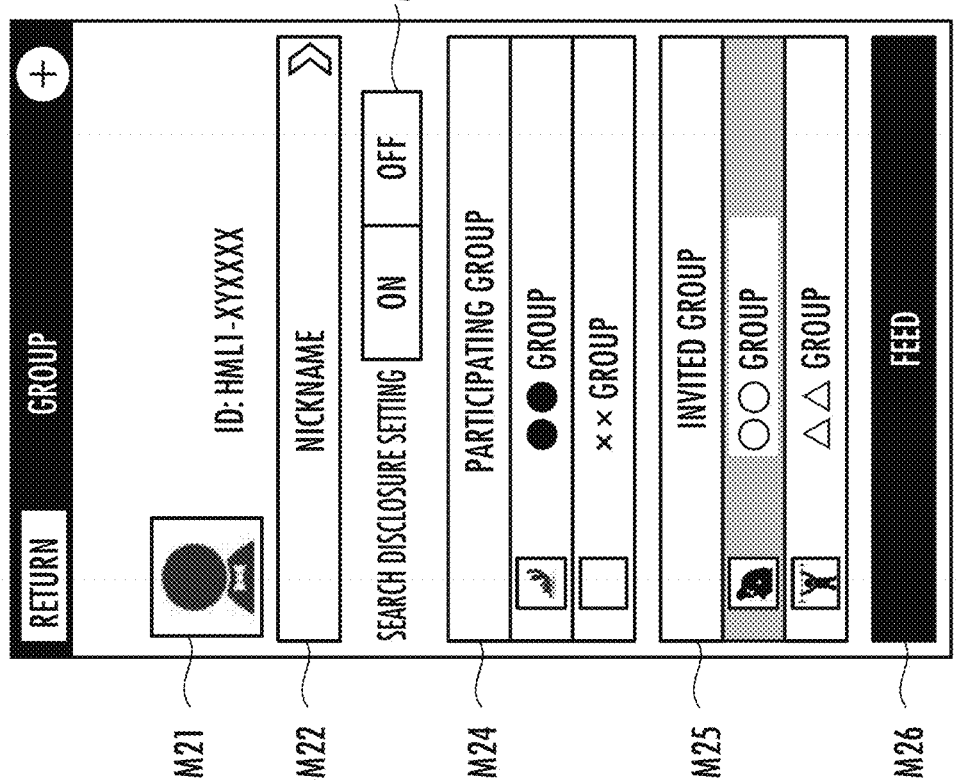

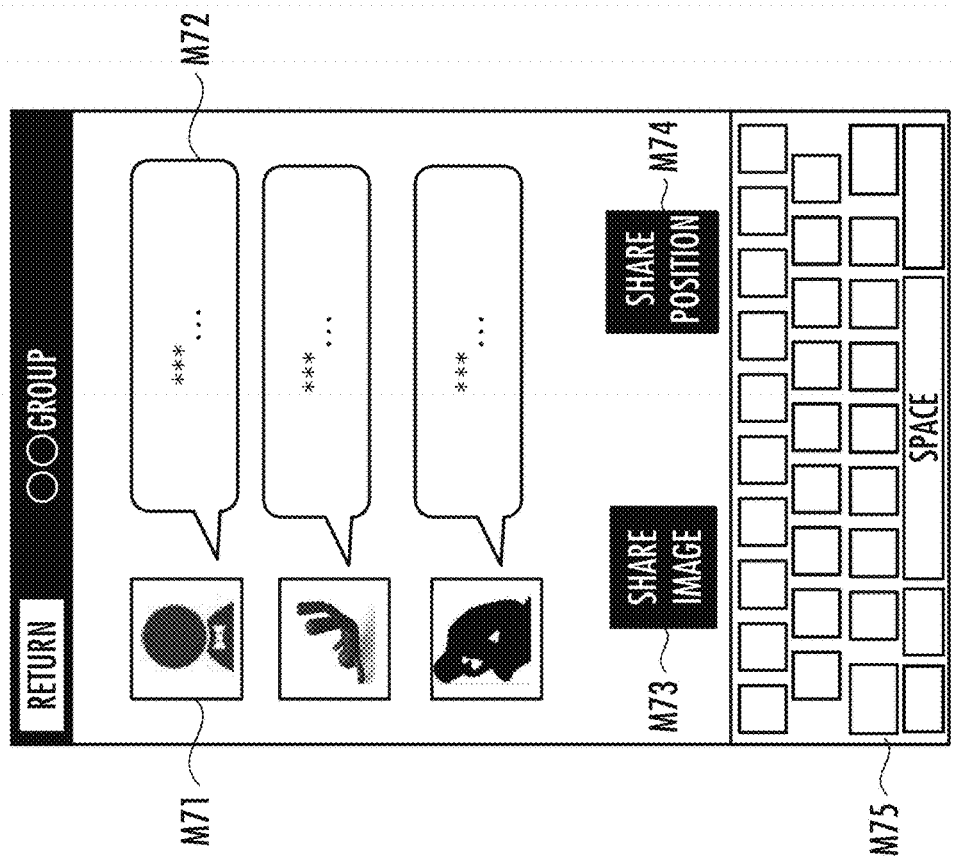
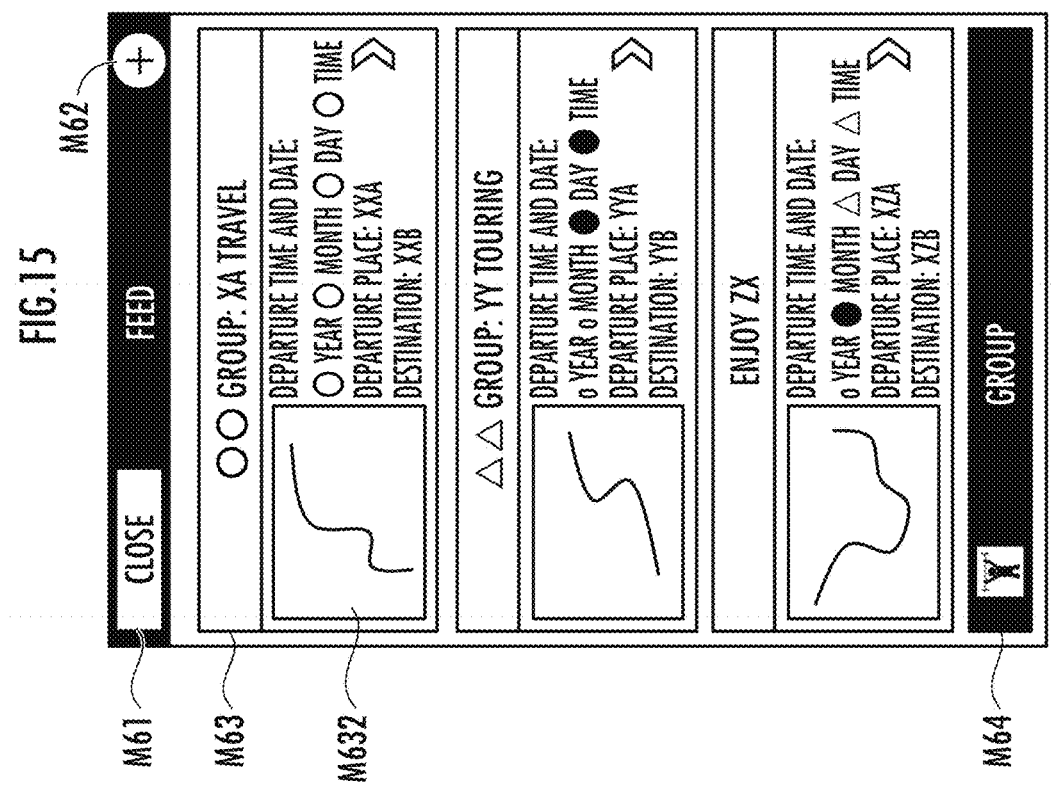
FIG.15
FIG.16

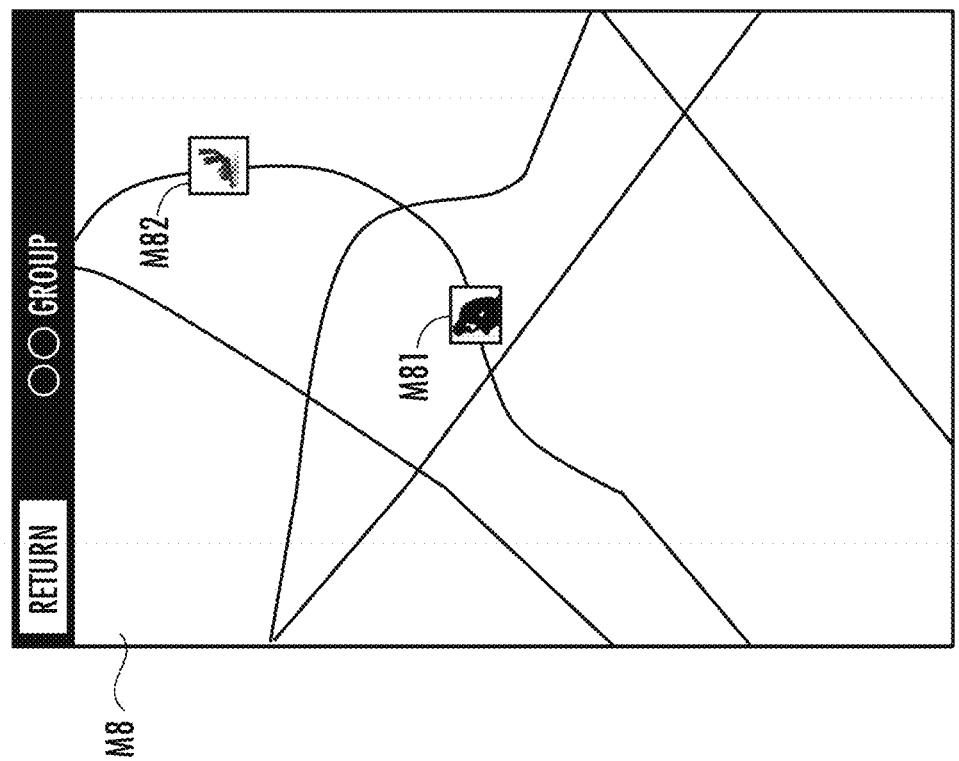
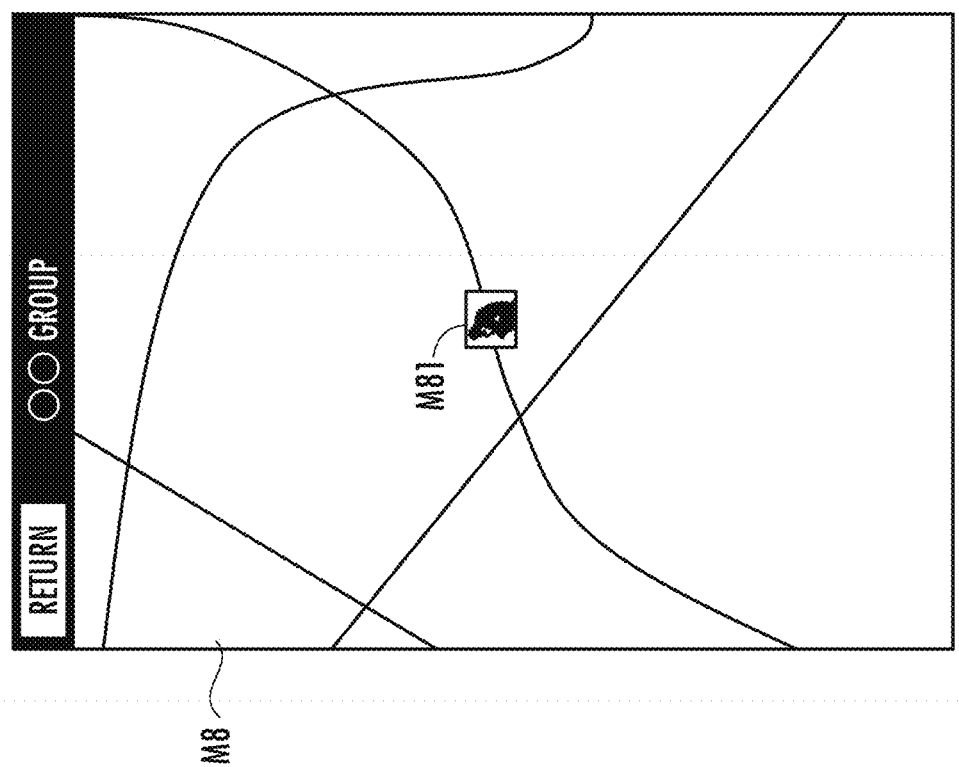

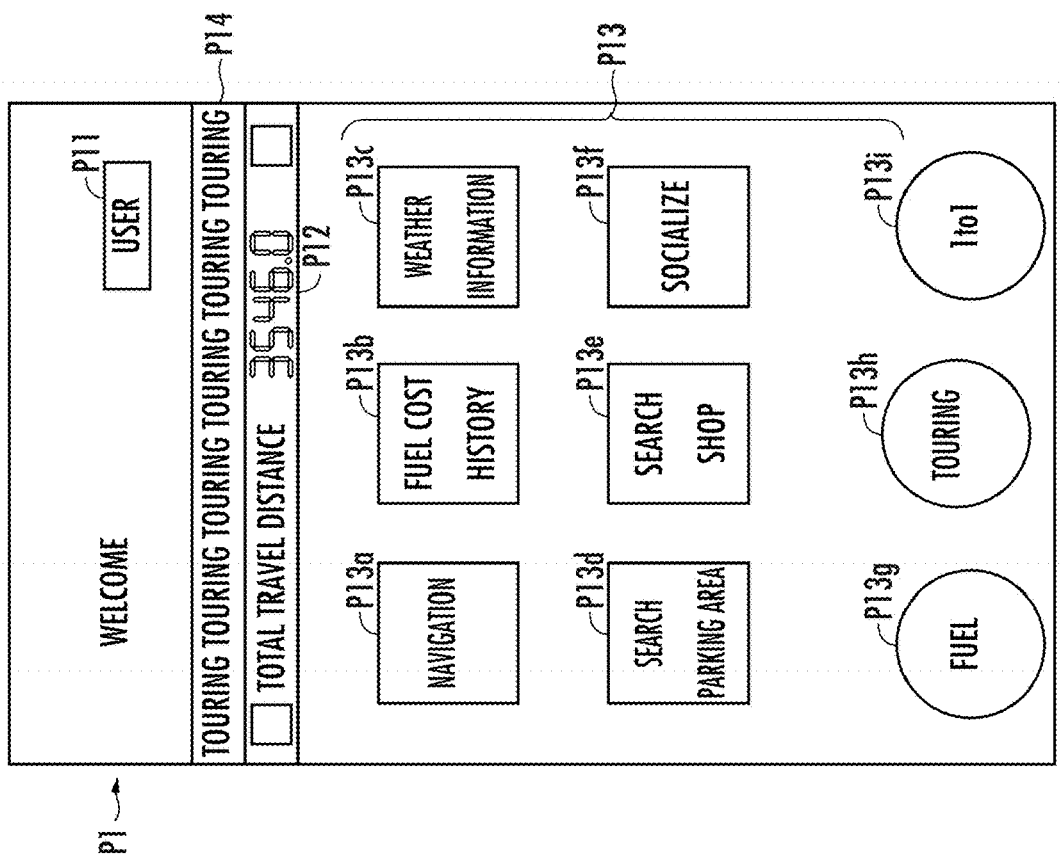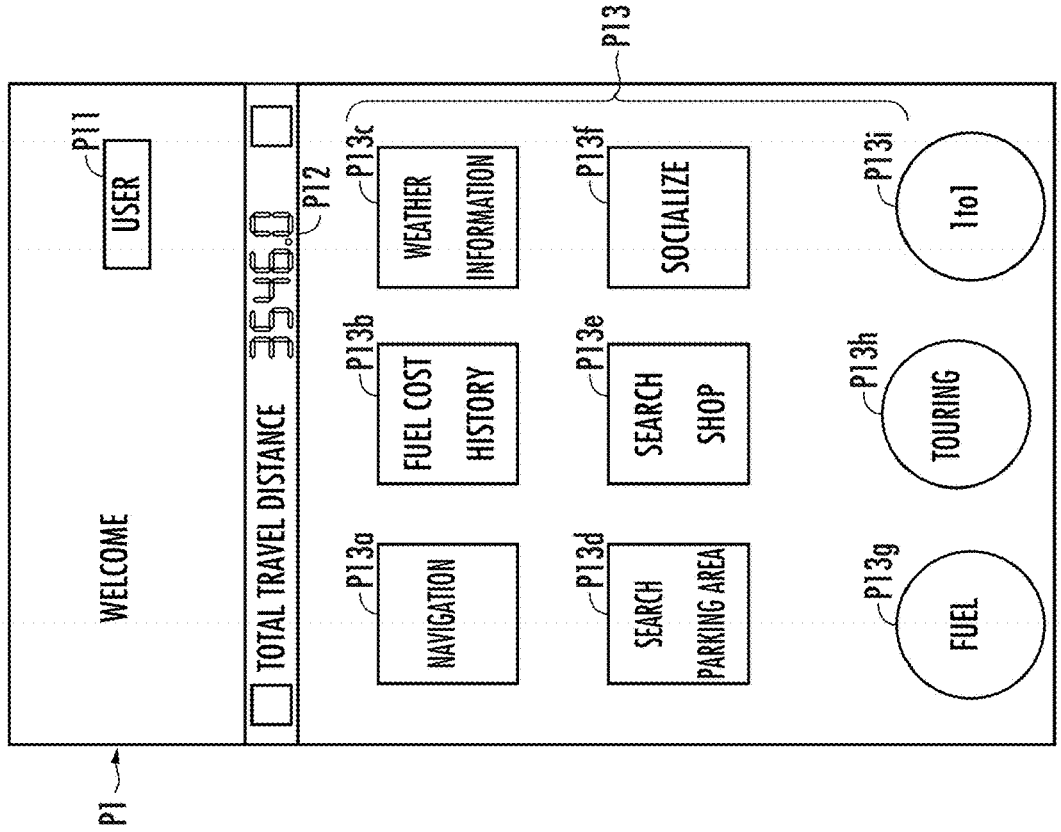

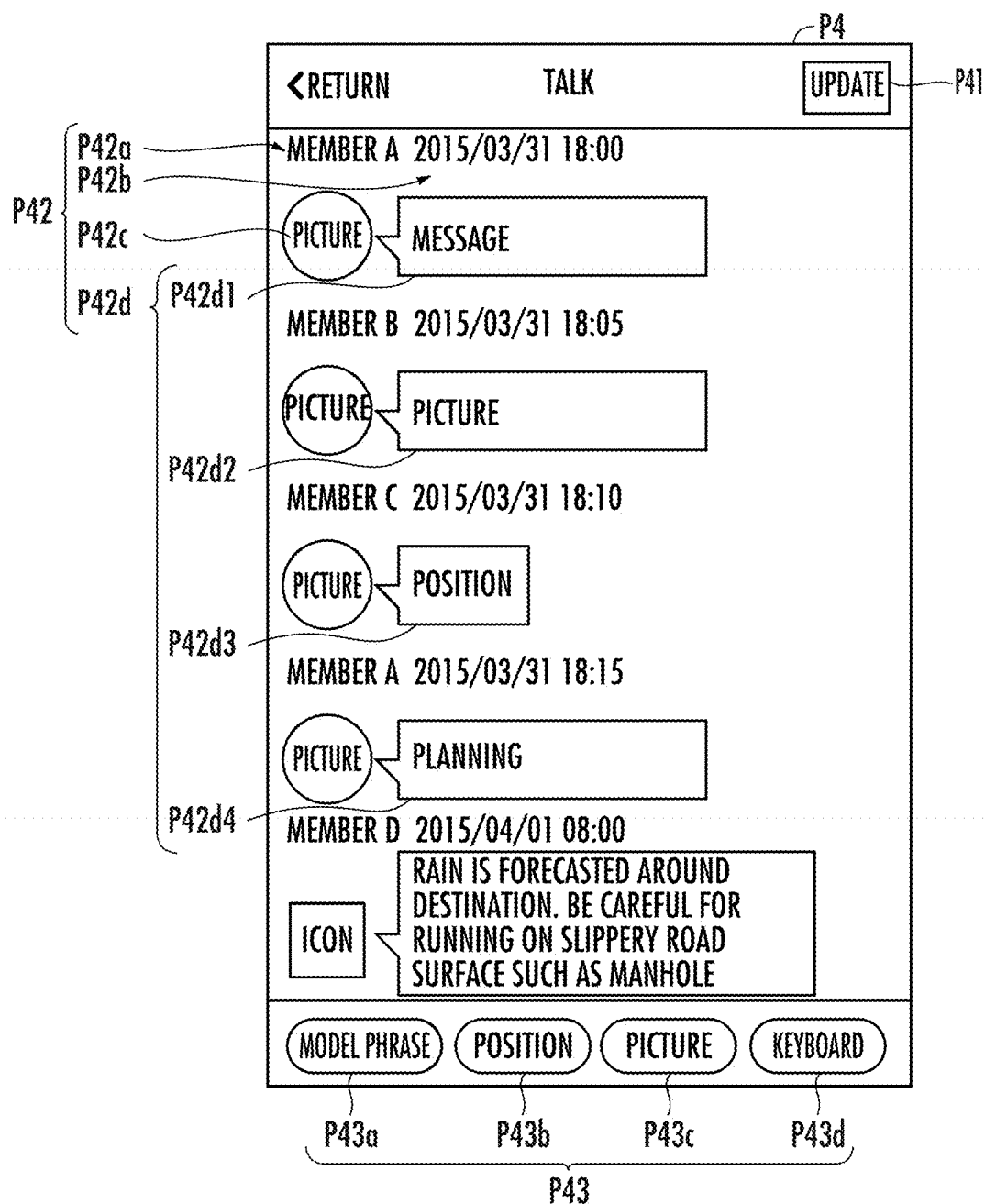

< RETURN    EDIT PLAN

TIME AND DATE
[2015/04/01 MEET AT 10:00 ~15:00] —P71

PROJECT NAME
[○○ TOURING] —P72

MEETING PLACE
[                    ] —P73

DESTINATION
[                    ] —P74

REPRESENTATIVE MEMBER A
COMMENT ON PROJECT
[TOURING TO GO TO LAKE ○○ AND EAT △△ THAT IS IN SEASON.] —P75

PICTURE UPLOAD —P76

INVITED GROUP

☑ ○○ GROUP ◄————— P77a
COMMENT [EVERYONE, PLEASE JOIN] —P77b  } P77
ADD INVITED GROUP    ➕ —P77c ( CREATE THIS PROJECT ) —P78 ns a configuration of a front page in a touring mode;
SERVER, CLIENT, AND INFORMATION SHARING SYSTEM

BACKGROUND OF THE INVENTION

Field of the Invention

The present invention relates to techniques for sharing information among a plurality of users.

Description of Related Art

There has been proposed a technical method of variably setting the shape of a comment frame so as to ensure visibility of icons and comments in a map screen of a navigation device (see Japanese Patent Application Laid-Open No. 2013-181956).

In order to perceive the situations of each other between a plurality of members constituting a group having the same transportation purpose, there is proposed a technical method that a taken image representing the state of a vehicle moving direction obtained through a mobile information terminal of a first one of the members and information related to identification information of a mobile information terminal of another member is displayed by a mobile information terminal of the first member (Japanese Patent Application Laid-Open No. 2013-210979).

If an outline of an itinerary can be perceived in advance by each of the plurality of members, this serves as a reference for judging participation or non-participation in the itinerary.

SUMMARY OF THE INVENTION

Therefore, it is an object of the present invention to provide a system, etc. capable of facilitating communication about a travel in which a plurality of members participate.

A server of the present invention having a communication function with each of a plurality of clients serving as mobile stations comprises: a server storage device that stores one or a plurality of belonging-target group(s) of respective users of the plurality of clients and a server control device; wherein, based on communication with a first client among the plurality of clients, the server control device is configured to recognize a plan about a first group to which the user of the first client belongs, the plan being determined by a departure place, a stopover, a destination, and a route from the departure place to the destination via the stopover; and based on communication with a second client of a user among the plurality of clients, the user belonging to the first group as the belonging-target group stored by the server storage device, the server control device is configured to cause the second client to display a departure place icon, a stopover icon, and a destination icon respectively representing the departure place, the stopover, and the destination included in the plan and the route.

According to the server, the client, and the information sharing system of the present invention, the route determined by the first member via the client thereof (first client), the stopover, the attribute of the stopover, and information about the stopover can be informed to the other member(s) belonging to the same group via the client (second client).

Furthermore, since messages can be exchanged between the users belonging to the same group, communication about the plan can be carried out. As a result, communication among the plurality of members about the plan determined by the route is facilitated.

BRIEF DESCRIPTION OF THE DRAWINGS

FIG. 4 is an explanatory drawing about a position-information sharing function by the information sharing system;

FIG. 5 is an explanatory drawing about a group creation screen;

FIG. 6 is an explanatory drawing about a developed mode of the group creation screen;

FIG. 7 is an explanatory drawing about a group screen;

FIG. 8 is an explanatory drawing about a developed mode of a group creation screen;

FIG. 15 is an explanatory drawing about a feed creation screen;

FIG. 16 is an explanatory drawing about a normal talk screen;

FIG. 17 is an explanatory drawing about a first example of a position sharing screen;

FIG. 18 is an explanatory drawing about a second example of a position sharing screen;

FIGS. 27A and 27B are drawings showing configurations of front pages; wherein, FIG. 27A is a drawing showing a front page in a normal mode, and FIG. 27B is a drawing showing a configuration of the front page in a touring mode;

FIG. 28C is a drawing explaining a configuration of a talk screen;

FIG. 29C is a drawing explaining a configuration of a plan creation screen;

DETAILED DESCRIPTION OF THE PREFERRED EMBODIMENTS

First Embodiment

Figure 1:
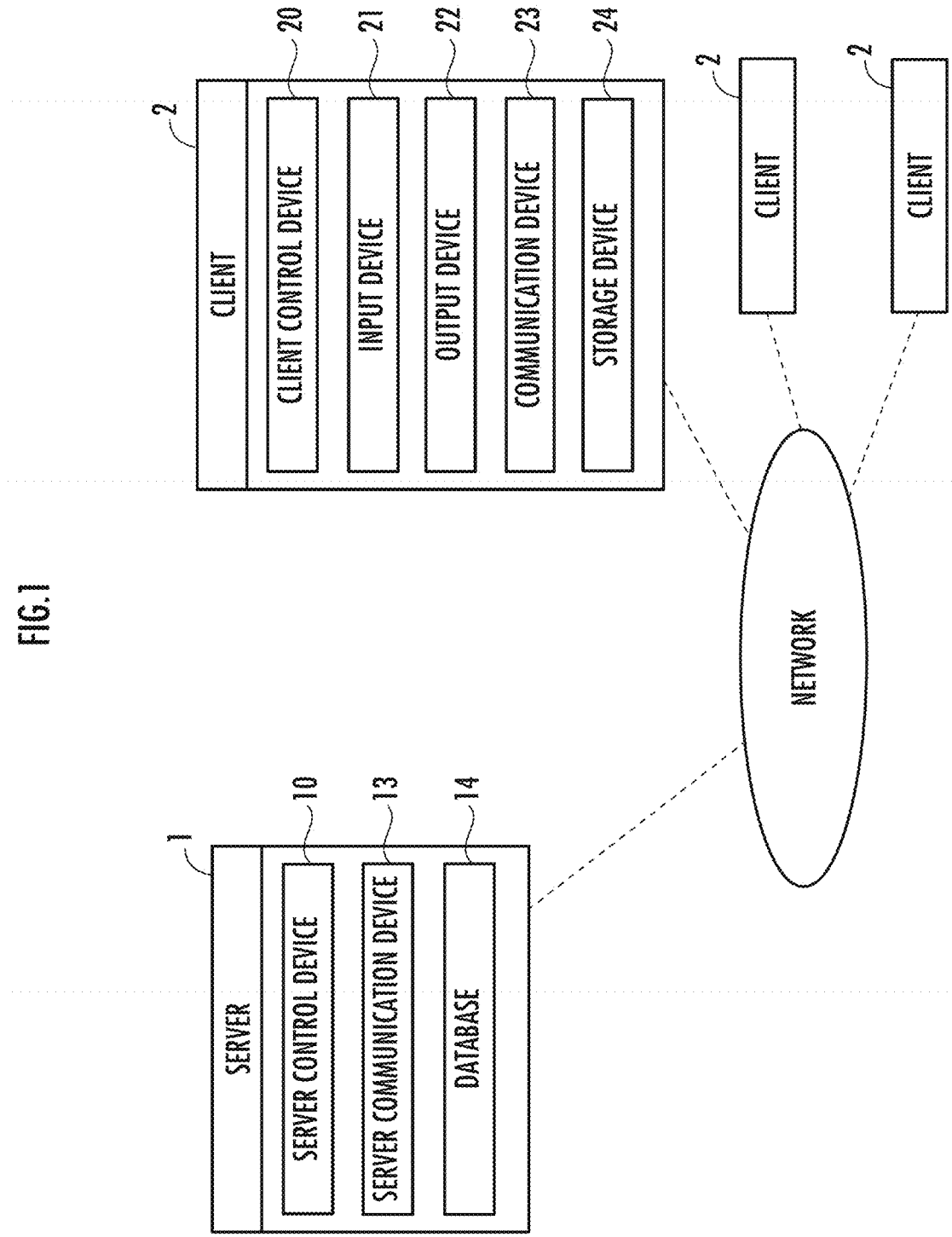
FIG. 1 is a configuration explanatory drawing of an information sharing system as a first embodiment.

An information sharing system of a first embodiment of the present invention shown in FIG. 1 consists of a server 1 and clients 2 serving as mobile stations, which can mutually communicate via a network.

The server 1 comprises a server control device 10, a server communication device 13, and a database 14 (server storage device). The server control device 10 consists of, for example, a memory (storage device) such as a ROM and a RAM and an I/O circuit. The server control device 10 is configured to execute later-described arithmetic processing.

The expression that a constituent element of the present invention is "configured" so as to execute assigned arithmetic processing means that an arithmetic processing device such as a CPU constituting the constituent element is "programmed" or "designed (planned)" so as to read software from a memory or a recording medium such as a ROM, a RAM, etc. in addition to necessary information and execute arithmetic processing with respect to the information in accordance with the software. Constituent elements may consist of a common processor (arithmetic processing device), or constituent elements may consist of a plurality of processors which can mutually communicate.

Part or all of a computer(s) constituting the server control device 10 may consist of a computer(s) constituting a client control device 20. For example, part or all of the server 1 may consist of the one or plurality of clients) 2 serving as a mobile station(s).

The client 2 consists of an information terminal such as a tablet-type terminal or a smartphone designed to have a size, a shape, and a weight so that it can be carried by a user. The client 2 may be an information terminal which is designed to have a size, etc. so that it can be mounted in a vehicle. The client 2 comprises the client control device 20, an input device 21, an output device 22, and a storage device 24. The client 2 further comprises a communication device 23 for mutually communicating with an external terminal(s) such as the server 1 in accordance with communication standards which are appropriate for long-distance wireless communication such as WiFi (registered tradename).

The input device 21 consists of a position input device such as a touch pad, the output device 22 consists of a display device such as a liquid crystal panel, and both of the devices are combined to constitute a touch panel. Thus, the touch panel can function as an input interface and an output interface. The touch panel displays a function image(s) corresponding to the functions of an application(s) (application software) installed in the client 2.

The input device 21 may alternatively or additionally consist of a detection device which detects the mode of input operations (speech contents or gestures) of the user by a non-contact method such as a sound input device (microphone) or an image taking device. The output device 22 may additionally consist of a sound output device (speaker). If the input device 21 is an image taking device or the like which can distinguish gestures (movements of face expressions or movements of body parts such as finger tips or arms) of the user by a non-contact method, the mode of the gestures can be detected by the client control device 20 as the mode of input operations.

The client control device 20 consists of a computer. The client control device 20 is configured to execute later-described arithmetic processing. The client 2 comprises a self-location measuring function by utilizing, for example, GPS.

The client control device 20 functions as a user interface manager (UIM), for example, the client control device 20 adjusts the display contents of the touch panel depending on the mode of the touch gesture of the user on the touch panel. Examples of the touch gestures include tapping (single tapping double tapping and long tapping), flicking (upward flicking downward flicking leftward flicking and rightward flicking), swiping pinching (pinching-in and pinching-out), or multi touches.

The expression that a first device "recognizes" information based on communication with a second device means execution of every arithmetic processing for acquiring the information accompanied by communication, for example: the first device receives the information from the second device; the first device derives the information by executing predetermined arithmetic processing (for example, calculation processing or search processing) by using the signals received from the second device as targets; the first device receives the information, which is the result of arithmetic processing by the second device, from the second device; and the first device reads the information from an internal storage device or an external storage device in accordance with the received signals.

(Functions)
(Group Registration)

A method of registering one or a plurality of groups serving as a belonging target(s) of each of the plurality of clients 2 or users thereof with respect to the database 14 of the server 1 will be explained. In accordance with needs, the clients 2 are separated into a first client 2a and a second client 2b (see FIG. 2 and FIG. 3). The user of the first client 2a is referred to as "first user", and the user of the second client 2b is referred to as "second user". The clients 2 can function as the first client 2a and the second client 2b, respectively. Transverse arrows in FIG. 2 and FIG. 3 represent unidirectional or bidirectional communication of data or signals through the network of the server 1 and the clients 2.

When one application icon is operated (touch panel operation) from among a plurality of application icons displayed on the touch panel at the client 2, a corresponding application is activated. In accordance with this, a front page including a plurality of menu buttons is displayed on the touch panel. When a designation menu (for example, a touring menu) is operated from among the plurality of menus, the server control device 10 recognizes a user ID, which is for distinguishing the user of the client 2, based on communication with the client 2 and then determines whether or not a profile associated with the user ID is registered in the database 14.

Figure 2:
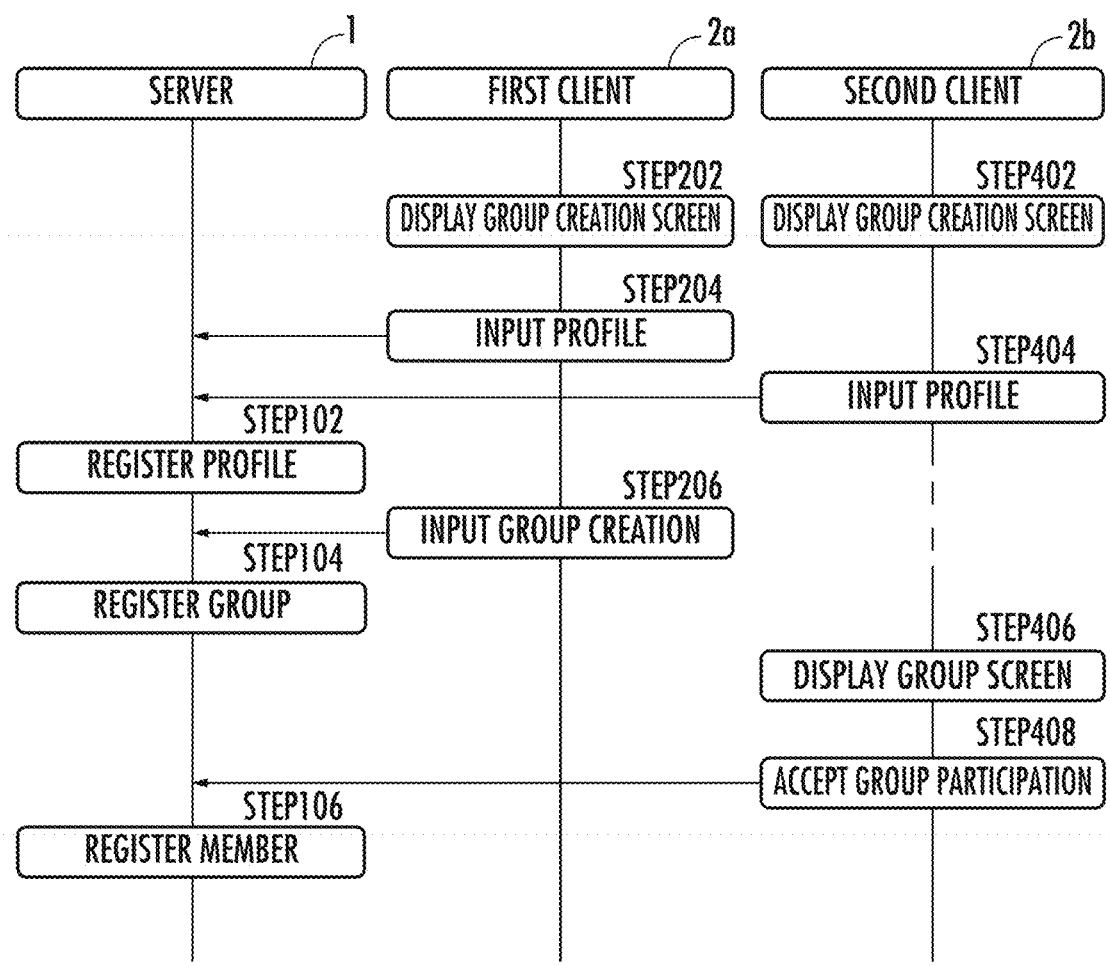
FIG. 2 is an explanatory drawing about a group registering function by the information sharing system.
Figure 3:
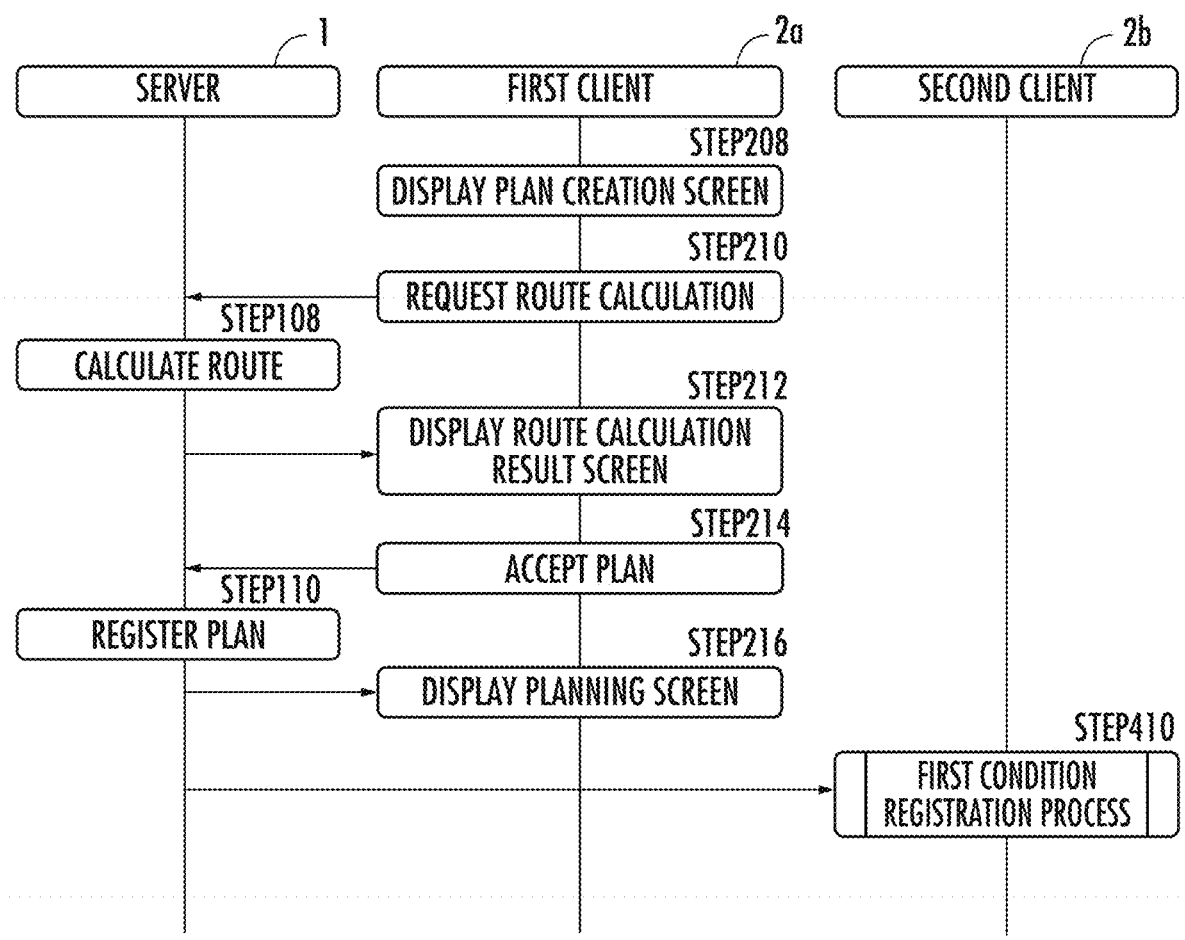
FIG. 3 is an explanatory drawing about a plan-information sharing function by the information sharing system.

If the profile of the user is unregistered when the designation menu is operated, a "group creation screen" is displayed on the touch panel of the client 2 (FIG. 2/STEP 202, STEP 402). For example as shown in FIG. 5, the group creation screen includes a registration button M11 of an icon image of the user, a nickname button M12, set buttons M13 of the searchability of the profile by others, a group creation button M14, and a completion button M15. By operations of the buttons, the profile of the user including the icon image and a nickname is set (FIG. 2/STEP 204, STEP 404). When a "RETURN" button, which is at the upper left of the screen, is operated, the display screen of the touch panel makes a transition to a previous display screen. Since this is similar also in other later-described screens, the explanation will be omitted hereinafter.

In response to an operation of the button M11, a plurality of images saved in the storage device 24 (image folder) of the computer constituting the client 2 are displayed on the touch panel, and, in response to a further selection, one image is selected from among the plurality of images. An image(s) taken by the image taking device mounted in the client 2 also serves as a selection option(s). If the button M12 is operated, a nickname is editably input through an operation(s) of character keys (illustration omitted) displayed on the touch panel. When either one of the ON/OFF buttons M13 is operated to be selected, the profile searchability by other users is set. After this setting, when the completion button M15 is designated by a touch panel operation, the server control device 10 associates the profile and the user ID with each other and registers them in the database 14 based on communication with the client 2 (FIG. 2/STEP 102).

In the first client 2a, if the group creation button M14 is designated, as shown in FIG. 6, a registration button M141 of an icon image of a group, a group name button M142, a keyword button M143, and a search button M144 are displayed on the touch panel. By operations of the buttons, the icon image, the name, and a user who is a participation candidate or an invitation target of the group are set. As a result, the group or a basis thereof specified by the icon image, the name, and the profile of the user serving as the participation candidate or the invitation target is created (FIG. 2/STEP 206).

For example, in response to an operation of the button M141, a plurality of images saved in the storage device 24 (image folder) of the first client 2a are displayed on the touch panel, and one image is selected from among the plurality of images in response to a further selection. When the button M142 is operated, a group name is editably input through an operation(s) of the character keys (illustration omitted) displayed on the touch panel. When the button M143 is operated, a keyword is editably input through an operation(s) of the character keys (illustration omitted) displayed on the touch panel. When the search button M144 is designated, based on communication with the first client 2a, the server control device 10 searches the database 14 for a profile(s) that has a nickname(s) including the input keyword and is set to "enable" the search by others. Based on communication with the first client 2a, the server control device 10 displays the result of the search on the touch panel (group creation screen). If the search result was not successful, re-search of users is executed in response to re-input of a keyword.

If the completion button M15 is designated, based on communication with the first client 2a, the server control device 10 mutually associates the user ID of the first user, the user ID of the profile-searched second user, and a group ID for distinguishing the group, which is created by the first user, and registers them in the database 14 (FIG. 2/STEP 104). The profiles and the group may be collectively registered in the database 14 by designating the completion button M15 at the point when the profiles of the users and the group are set.

At this point, the group is in a state in which only the first user who is the creator thereof is participating, and the second user is only invited to the group and has not yet participated therein. In other words, this is a state in which only a core or a basis of the group is formed. One user may create a plurality of groups and may participate in a plurality of groups. The fact that the first user is in a participated state is associated with the user ID of the first user and the group ID of the group and is registered in the database 14. The fact that the second user is in a non-participated state is associated with the user ID of the second user and the group ID of the group and is registered in the database 14.

At the second client 2b, at the point when the designation menu is designated, if the profile of the second user has been registered and the application is set to a first mode (for example, non-touring mode), a "group screen" is displayed on the touch panel (FIG. 2/STEP 406). For example as shown in FIG. 7, the group screen includes a registration button M21 of an icon image of the user, a nickname button M22, a set button M23 of the searchability of the profile by others, a list M24 of "participating groups", and a list M25 of "invited groups". Each of the lists shows icon images and names of the groups, which are registered in the database 14 in association with the user ID of the second user. As well as the group creation screen (see FIG. 5), the profile of the user including an icon image and a nickname is input or edited by touch panel operations according to the buttons, etc. (see FIG. 2/STEP 204, STEP 404).

At the second client 2b, in response to the fact that a single group has been selected from among the list M25 of the groups to which the second user is invited, as shown in FIG. 8, a window M252 of the single group is displayed on the touch panel. The window M252 includes an icon image M2521 and a group name of the group and a button M2522 (YES/NO) for selecting participation or non-participation to the group. If the YES button of the button M2522 is selected (FIG. 2/STEP 408), based on communication with the second client 2b, the server control device 10 mutually associates the fact that the second user is in a participated state with the user ID of the second user and the group ID of the group and registers them in the database 14 (FIG. 2/STEP 106). As a result, the group of a belonging target of the second user is registered in the database 14.

The group screen includes a feed button M26 (see FIG. 7 and FIG. 8), and, in response to designation of the button M26, at the first client 2a, the client control device 20 causes the display screen of the touch panel to make a transition to a feed screen (see FIG. 15).

At the second client 2b, based on communication with the server 1, the client control device 20 may display, on the touch panel, a message (push message) that the second user is invited to the group of the first user. As a result, for example, the second user is urged to carry out a touch panel operation for activating the application, and this serves as a trigger to display a group screen on the touch panel of the second client 2b.

(Plan Creation)

A creation method of a touring plan (itinerary) of each group registered in the database 14 of the server 1 will be explained.

In response to an operation at the first client 2a, based on communication with the first client 2a, the server control device 10 determines presence/absence of a plan registered in the database 14 in association with the user ID of the first user and a group ID of a group designated by the operation (presence/absence of a plan ID (group action ID) associated with the group ID). The plan means the plan of the group created by the first user or the group in which the first user participates. In response to a determination result that the corresponding plan is not present, a "primary planning screen" is displayed on the touch panel of the first client 2a.

In response to a determination result that the corresponding plan is present, a "secondary planning screen (see FIG. 14)" is displayed on the touch panel of the first client 2a.

Figure 9:
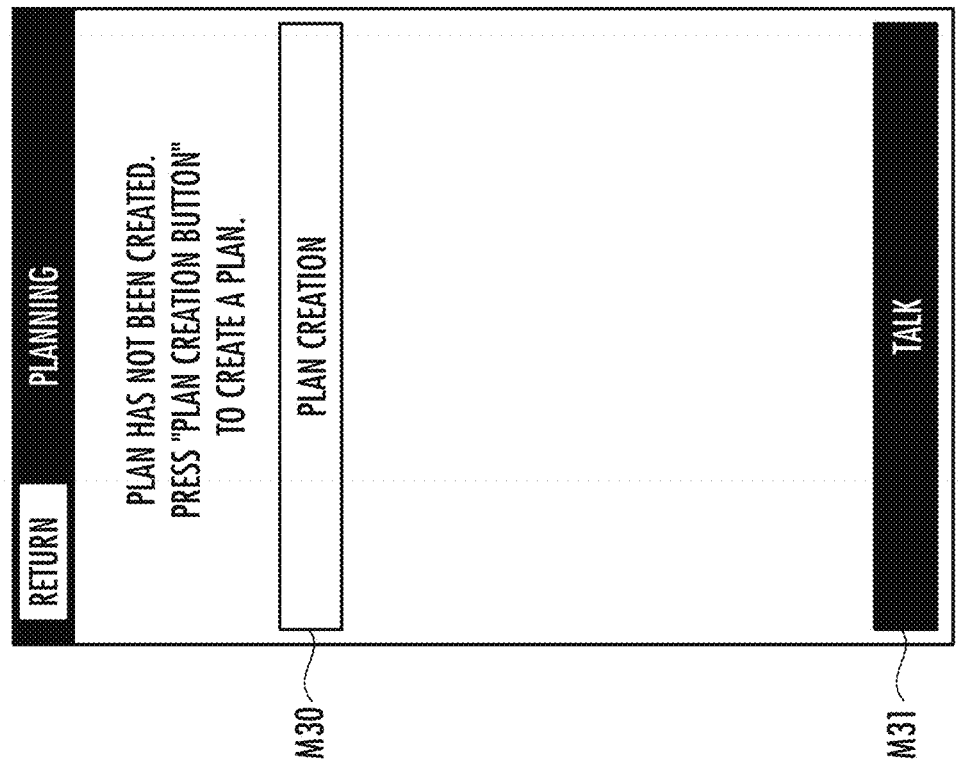
FIG. 9 is an explanatory drawing about a developed mode of a planning screen in a state with no plan.

For example as shown in FIG. 9, the primary planning screen includes a message which urges plan creation, a button M30 for starting plan creation, and a talk button M31. When the plan creation button M30 is operated, the display screen of the touch panel makes a transition to a plan creation screen (FIG. 3/STEP 208). When the talk button M31 is designated, the display screen of the touch panel makes a transition to a talk screen (see FIG. 16).

Figure 10:
FIG. 10 is an explanatory drawing about a plan creation screen.
Figure 11:
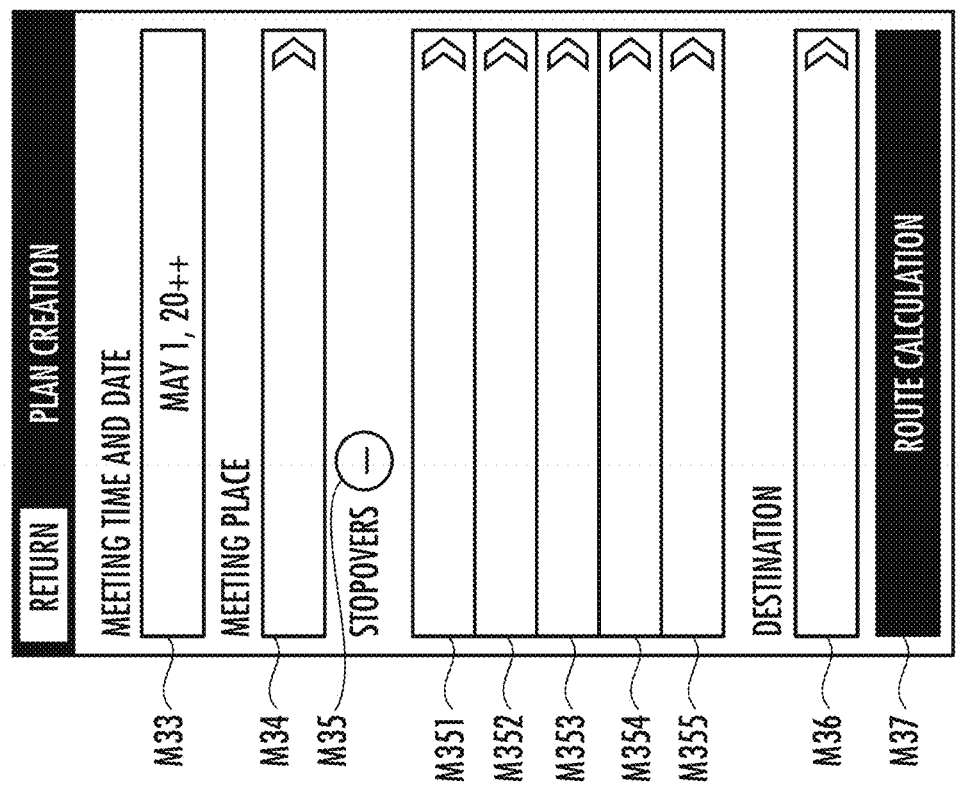
FIG. 11 is an explanatory drawing about a developed mode of a plan creation screen.

The plan creation screen constitutes an input/output interface for creating or setting a plan or an itinerary determined by meeting time and date, a departure place, a stopover(s), a destination, and a route from the departure place to the destination through the stopover(s). For example as shown in FIG. 10, the plan creation screen includes a course name button M32, a meeting time/date button M33, a meeting place button M34 (departure place button), a stopover button M35, a destination button M36, a route calculation button M37, and a member invitation button M39. When the stopover button M35 is operated, for example, a predetermined number (for example, "5") of stopover entry fields M351 to M355 are displayed on the touch panel as shown in FIG. 11.

A course name is input or edited through operations of the course name button M32 and the character keys displayed on the touch panel. Departure time and date is input or edited through operations of the meeting time/date button M33 and the character keys displayed on the touch panel (or calendar and clock). When the entry fields M34, M351 to M355, and M36 corresponding to a meeting place, a stopover(s), and a destination are operated, the display screen of the touch panel makes a transition to a locational-point setting screen.

The name(s) of a member(s) invited to the plan is input or edited through operations of the member invitation button M39 and the character keys displayed on the touch panel.

Figure 12:
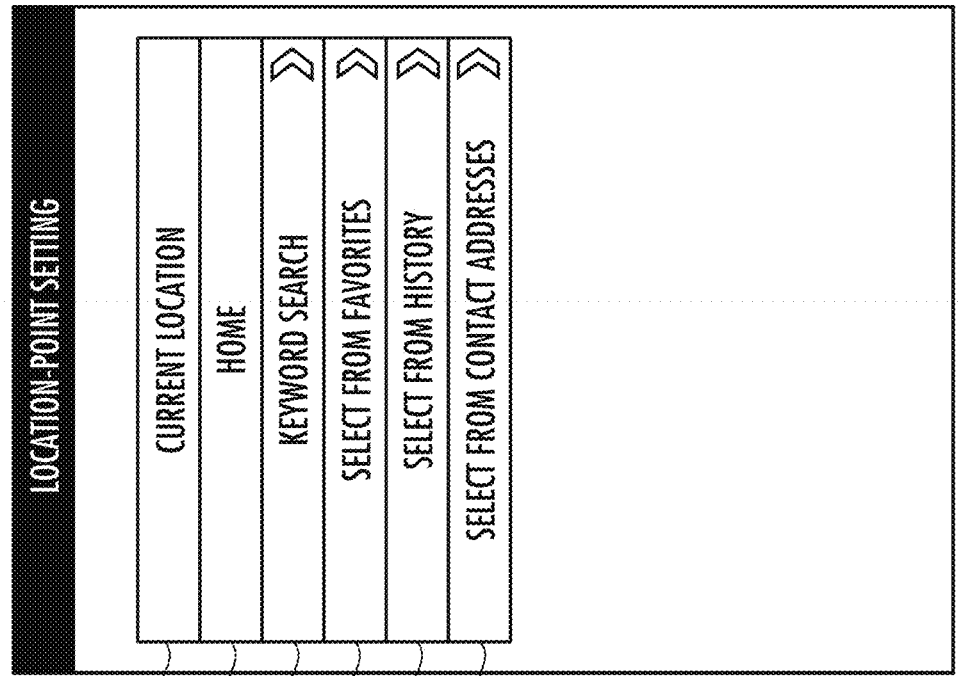
FIG. 12 is an explanatory drawing about a locational-point setting screen.

As shown in FIG. 12, the location-point setting screen includes a "CURRENT LOCATION" button M381, a "HOME" button M382, a "KEYWORD SEARCH" button M383, a "SELECT FROM FAVORITES" button M384, a "SELECT FROM HISTORY" button M385, and a "SELECT FROM CONTACT ADDRESSES" button M386. In response to an operation of the current location button M381, the current location (specified by a latitude/altitude coordinate value and, in accordance with needs, an altitude) of the first client 2a measured by a GPS positioning function thereof is set as, for example, a meeting place. In response to selection of the home button M382, the location (specified by a latitude/longitude coordinate value and, in accordance with needs, an altitude) of a home which is registered in the storage device 24 of the first client 2a in advance is set as, for example, a meeting place. In response to designation of the keyword search button M383, in response to a further operation after a keyword is input through operations of the character keys on the touch panel, a location point specified by a location name including the keyword is set as, for example, a stopover. In response to designation of each of the selection buttons M384 to M386, a list of, for example, location names stored in the storage device 24 of the first client 2a in advance is displayed, and a locational point specified by, for example, one locational name selected from the list is set as, for example, a destination. As a result, the departure place, the stopover(s), and the destination are recognized by the client control device 20.

After the locational point is set, the display screen of the touch panel makes a transition to a plan creation screen (see FIG. 10 and FIG. 11). Each of the meeting place, the stopover(s), and the destination may be input through operations of the character keys on the touch panel.

At the first client 2a, when the route calculation button M37 is designated, the client control device 20 requests a route calculation to the server 1 by network communication (FIG. 3/STEP 210). The request includes the meeting time and date (departure time and date), the meeting place (departure location), the stopover(s), and the destination input to the first client 2a in the above described manner.

In response to this request, after the server control device 10 recognizes the meeting time and date, the meeting place, the stopover(s), and the destination included in the request, the server control device 10 calculates or searches for a route from the meeting place to the destination through the stopover(s) (FIG. 3/STEP 108). In the route calculation, in addition to road map information stored in the database 14 of the server 1, road traffic information acquired from an external road-traffic-information center, and weather information acquired from a weather information center is used. The server control device 10 transmits a route calculation result to the first client 2a. At the first client 2a, the client control device 20 recognizes the route calculation result and causes the display screen of the touch panel to make a transition to a route calculation result screen (FIG. 3/STEP 212).

Figure 13:
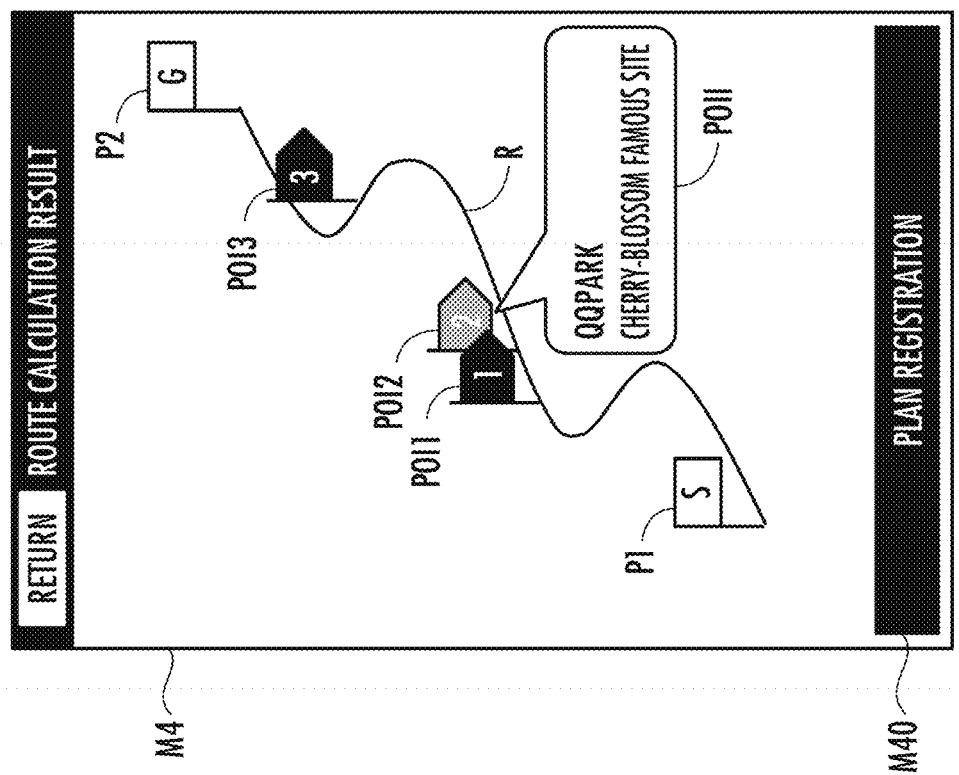
FIG. 13 is an explanatory drawing about a route calculation result screen.

As shown in FIG. 13, in the route calculation result screen, a departure-place icon P1 representing the departure place (meeting place), a destination icon P2 representing the destination, stopover icons POI1 to POI3 representing the stopovers, and a calculated route R are disposed at the corresponding parts of a map M4. At the first client 2a, the client control device 20 differentiates the design (means the colors, shapes, or patterns of the icons and combinations thereof) or display mode (including the distinguishment between still images and moving images such as the presence/absence of blinking) of the departure-place icon P1 and the destination icon P2 and the design or display mode of the stopover icons POIk (k=1, 2, ..., n: an arbitrary number can be set as "n").

At the first client 2a, the client control device 20 may search for the attributes (for example, characteristics of roads (sharp curves, steep slopes, poor visibility, accident-prone, etc.) facility types (scenic sites, parks, restaurants, commercial facilities, accommodation facilities, etc.)) of the stopovers represented by the stopover icons POIk from the map information saved in the storage device based on latitude/longitude and then differentiate the display modes of the stopover icons POIk depending on the attributes.

At the first client 2a, if any of the departure-place icon P1, the destination icon P2, and the stopover icons POIk is operated, the information (for example, latitude/altitude, name, or attributes) about the locational point represented by the designated icon may be shown by text on the touch panel. For example, as shown in FIG. 13, in response to the fact that the stopover icon POI2 is designated, a pop-up image POII showing, by text, the name of a facility (QQ park) present at the stopover and the attribute (cherry-blossom famous site) are displayed on the touch panel.

The route calculation result screen includes a plan registration button M40 (see FIG. 13). When the button M40 is operated, this plan (including the meeting time and date or the departure time and date, and the route R as a calculation result) is accepted by the first user (FIG. 3/STEP 214).

In response to this, based on communication with the first client 2a, the server control device 10 recognizes the plan, then, associates a plan ID (group action ID) allocated to the plan with the group ID of the selected group, and registers them in the database 14 (FIG. 3/STEP 110). Based on communication with the server 1, the client control device 20 causes the display screen of the touch panel to make a transition to a secondary planning screen (FIG. 3/STEP 216).

Figure 14:
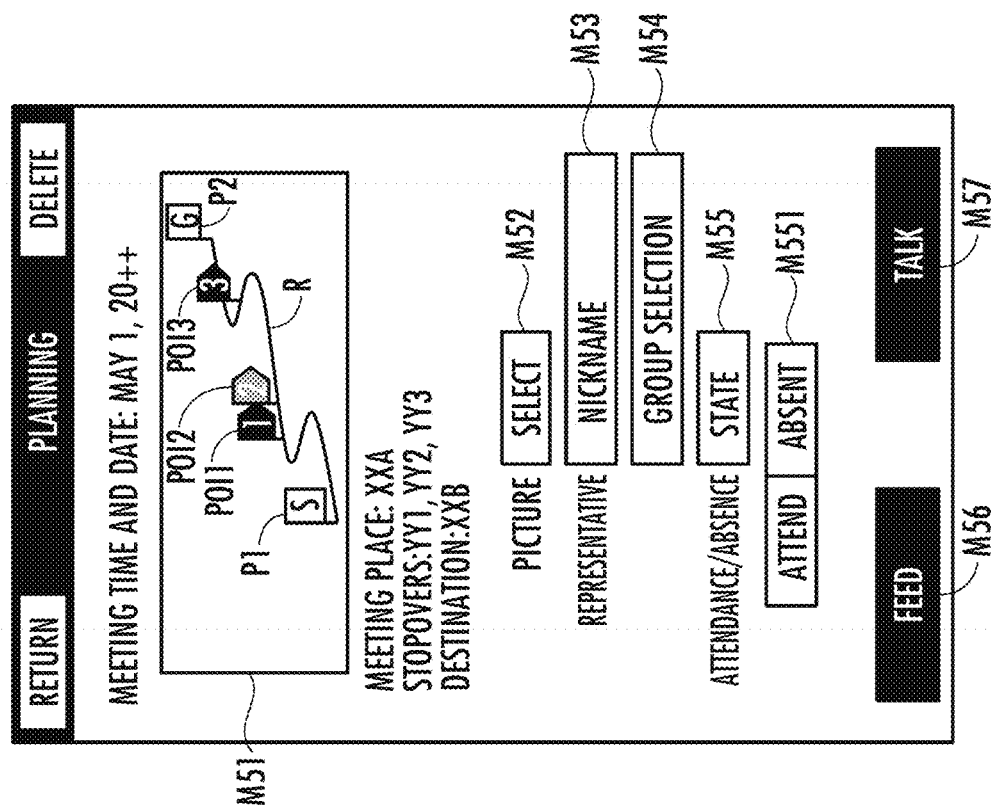
FIG. 14 is an explanatory drawing about a planning screen in a state with a plan.

For example as shown in FIG. 14, the secondary planning screen includes the meeting time and date, the meeting place, the names of the stopovers and the destination, and a window M51 including the route R and the icons P1, P2, and POIk. The secondary planning screen includes a picture selection button M52, a nickname field M53 of a representative, a group selection button M54, a state field M55, attendance/absence buttons M551, a feed button M56, and a talk button M57.

When the picture selection button M52 is operated, a plurality of images saved in the storage device 24 (image folder) of the computer constituting the first client 2a are displayed on the touch panel, and, in response to a further selection, one image is selected from among the plurality of images. In the nickname field M53 of the representative, a nickname of a group creator is displayed by default, but can be edited in accordance with operations of the character keys. The group selection button M54 displays the name of the selected group. The state field M55 displays the distinguishment of attendance (participation) and absence (non-participation) to the plan in accordance with selection of either one of the attendance/absence buttons M551. In response to an operation of the feed button M56, the display screen of the touch panel makes a transition to a feed screen (see FIG. 15). In response to an operation of the talk button M57, the display screen of the touch panel makes a transition to a talk screen (see FIG. 16).

In the route calculation result screen (see FIG. 13), pressing of the plan registration button M40 serves as a trigger to transmit the user ID of the member input or edited in the plan creation screen (see FIG. 10) to the server 1.

The server control device 10, which has received the user ID, records the state of invitation of the second user to the plan, which is distinguished by the user ID, into the database 14 of the server 1 and transmits a plan invitation message to the second client 2b, which is used by the invited second user.

At the second client 2b, which has received the plan invitation message, a first condition registration process is executed (FIG. 3/STEP 410). The first condition registration process will be described later.
(Plan Sharing)

A method of sharing information about a touring plan (itinerary) among a plurality of users or members having the same group as a belonging target registered in the database 14 will be explained.

In response to an operation such as an operation of the feed button M26 in the group screen (see FIG. 7) or an operation of the feed button M56 in the planning screen (see FIG. 14), based on communication with the server 1, the client control device 20 displays a feed screen on the touch panel of the second client 2b. For example as shown in FIG. 15, the feed screen includes a "CLOSE" button M61, a plan adding button M62, a plurality of plan buttons M63, and a group button M64.

When the close button M61 is operated, the display screen of the touch panel makes a transition to a top screen. When the plan adding button M62 is operated, the display screen of the touch panel makes a transition to a screen for adding a plan(s) such as a plan creation screen (see FIG. 10). The plan button M63 shows the name of the group in/to which the user of the second client 2b is participating or invited, the name of a plan associated with the group, departure time and date (meeting time and date), the names of a departure place and a destination, and a map showing an outline of a plan route. When the group button M64 is operated, the display screen of the touch panel makes a transition to a group screen (see FIG. 7).

At the second client 2b, when the single plan button M63 is operated, the client control device 20 recognizes the designated plan. In response to this, based on communication with the second client 2b, the server control device 10 recognizes the group ID of the group corresponding to the plan ID of the designated plan and then searches for the designated plan from the database 14 based on the group ID.

At the second client 2b, based on communication with the server 1, the client control device 20 recognizes the designated plan as a search result and then displays, on the touch panel, a screen showing the designated plan. This screen includes, for example, meeting time and date, the departure-place icon P1, the destination icon P2, the stopover icons POIk, and the route R (see FIG. 13 or FIG. 14).

At the second client 2b, the client control device 20 may differentiate the display modes of the stopover icons POIk depending on the attributes of the stopovers represented by the stopover icons POIk (see FIG. 13). At the second client 2b, when any of the departure-place icon P1, the destination icon P2, and the stopover icons POIk is operated, the information about the locational point represented by the designated icon may be displayed by text on the touch panel (see FIG. 13).
(Position/Image Information Sharing)

At the first client 2a, in response to an operation such as an operation of the talk button M31 in the primary planning screen (see FIG. 9) or an operation of the talk button M57 in the secondary planning screen, based on communication with the server 1, the client control device 20 causes the display screen of the touch panel to make a transition to a talk screen (FIG. 4/STEP 218). The talk screen is a screen for communication among group members participating in the same group.

For example as shown in FIG. 16, the talk screen includes the name of the group the first user is participating in, pop-up images M72 showing icons M71 of the users who have sent the messages among the users (members) participating in the group and the messages, an image sharing button M73, a position sharing button M74, and character keys M75.

When a message is input through operations of the character keys M75 in the talk screen and when an operation of sending the message is carried out (FIG. 4/STEP 220), based on communication with the first client 2a, the server control device 10 recognizes the group ID of the group with which the message and the first user intend to contact. The server control device 10 specifies the second client 2b of the second user, which is distinguished by the user ID associated with the group ID (FIG. 4/STEP 114).

Based on communication with the server 1, the client control device 20 of the second client 2b carries out a later-described talk-screen selecting process (FIG. 4/STEP 412).

At the first client 2a, when the position sharing button M74 is operated, the client control device 20 detects this operation as an operation of a first designation mode and transmits a position sharing request, which is including the current position of the first client 2a and the group ID, to the server 1 (FIG. 4/STEP 222). The current position (latitude/longitude) of the first client 2a may be measured by a positioning function using GPS or may be set through operations of the touch panel (position designating operation of displayed map, location name inputting operation by character keys, etc.).

The server control device 10 searches the database 14 by using the group ID included in the request, thereby specifying the second client 2*b* of the second user distinguished by the user ID registered in the database 14 in association with the group ID (FIG. 4/STEP 116). Based on communication with the second client 2*b*, the server control device 10 causes the client control device 20 to recognize the position of the first user included in the request and display a position sharing screen on the touch panel (FIG. 4/STEP 414).

In the position sharing screen displayed on the touch panel of the second client 2*b*, for example as shown in FIG. 17, an icon M81 representing the first user, which is a transmission source of the position sharing request, is disposed and shown at a central position of a map M8. The position of the icon M81 in the map M8 may be changed to be included in a designated range occupying a central part of the map M8.

In response to operations of the character keys M75 displayed on the touch panel at the first client 2*a*, position sharing is requested after a message is input (see FIG. 4/STEP 222), and, based on communication with the first client 2*a*, the server control device 10 recognizes the message and then registers that in the database 14. This message is a message representing, for example, a current situation of the first user (taking a break at ●●, trouble occurred, running at low speed, etc.). At the second client 2*b*, if the client control device 20 detects display of the icon M81 representing the first user, based on communication with the server 1, the message sent from the first client 2*a* is recognized, and the message is then displayed on the touch panel.

At the first client 2*a*, when the image sharing button M73 is operated, as in position sharing, an image designated by the first user is displayed on the touch panel of the second client 2*b* so that it is shared by the second user who is participating in the same group.

(First Condition Registration Process)

As described above, in the plan creation process by the first user of the first client 2*a*, if information for specifying the second user such as the name or ID of the second user is input in the "invited member" field of the plan creation screen (see FIG. 3/STEP 208 and FIG. 10), pressing of the plan registration button M40 in the route calculation result screen (see FIG. 13) triggers the server control device 10 to transmit a plan invitation message about the plan to the second client 2*b* (see FIG. 3/STEP 214 and FIG. 3/STEP 410).

Hereinafter, with reference to FIG. 21 to FIG. 22, the first condition registration process, which is carried out in the second client 2*b* when the plan invitation message is received, will be explained.

Figure 21:
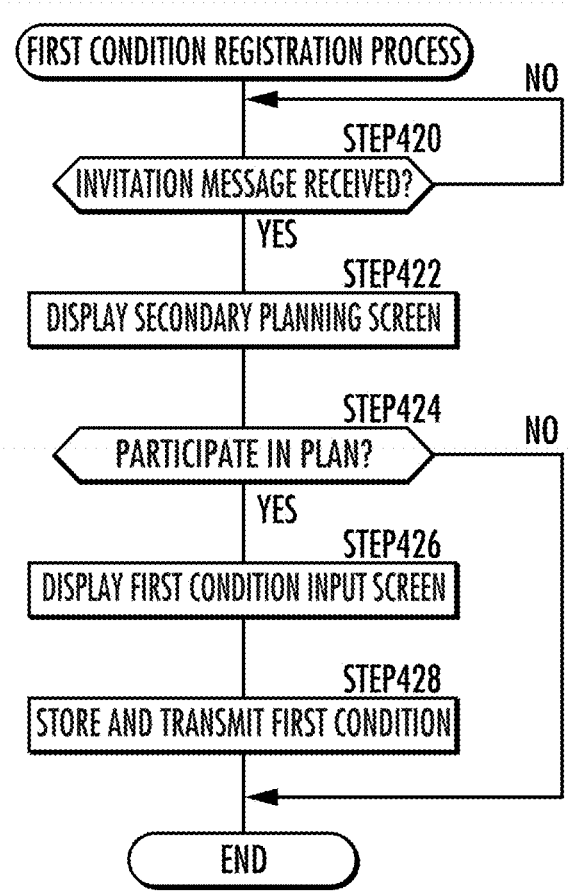
FIG. 21 is a flow chart of a first condition registration process.
Figure 22:
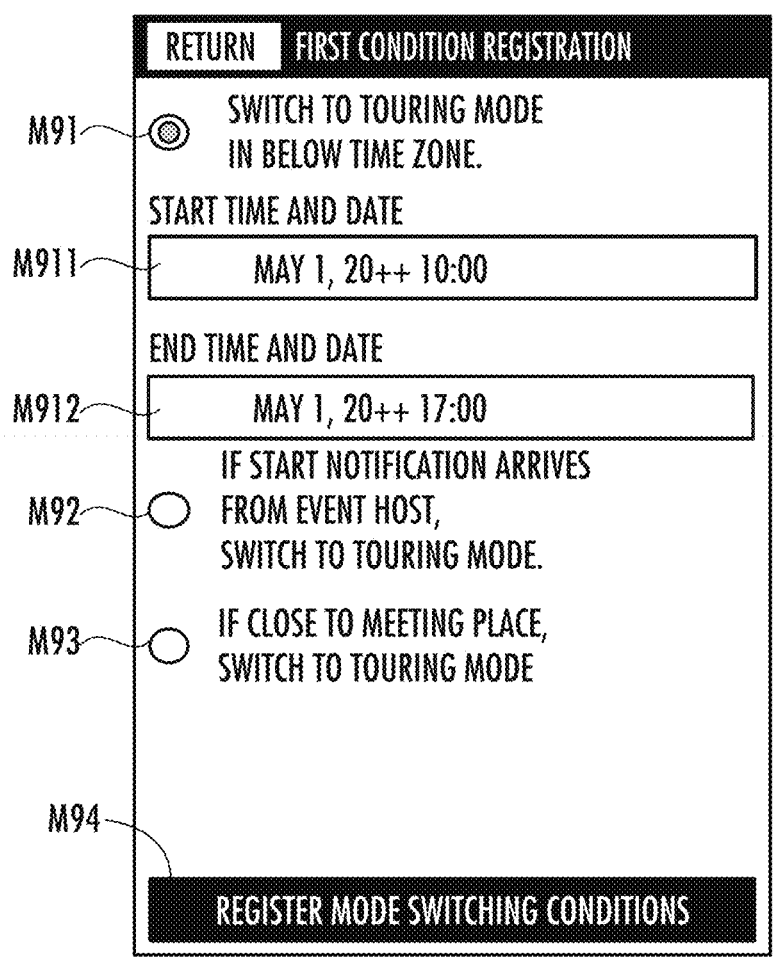
FIG. 22 is an explanatory drawing about a first condition registration screen.

The client control device 20 of the second client 2*b* determines whether or not the plan invitation message has been received via the communication device 23 (FIG. 21/STEP 420). If the determination result is negative (FIG. 21/STEP 420 . . . NO), the client control device 20 of the second client 2*b* executes the process of FIG. 21/STEP 420 again.

If the determination result is positive (FIG. 21/STEP 420 . . . YES), the client control device 20 of the second client 2*b* displays a secondary planning screen (FIG. 14) associated with the plan ID included in the plan invitation message (FIG. 21/STEP 422).

The present explanations include the part that is overlapped with the above described explanations of plan sharing; however, while the former one is the explanations of plan sharing (process until details of the plan, etc. are checked by the members), the present explanations explain a series of flows until actual participation in the plan.

Based on communication with the server 1, the client control device 20 of the second client 2*b* displays a feed screen on the touch panel of the second client 2*b*. For example as shown in FIG. 15, the feed screen includes the "CLOSE" button M61, the plan adding button M62, the plurality of plan buttons M63, and the group button M64.

When the close button M61 is operated, the display screen of the touch panel makes a transition to the top screen. When the plan adding button M62 is operated, the display screen of the touch panel makes a transition to a screen for adding a plan such as a plan creation screen (see FIG. 10). The plan button M63 shows the name of the group in/to which the user of the second client 2*b* is participating or invited, the name of a plan associated with the group, departure time and date (meeting time and date), the names of a departure place and a destination, and a map showing an outline of a plan route. When the group button M64 is operated, the display screen of the touch panel makes a transition to a group screen (see FIG. 7).

At the second client 2*b*, when the single plan button M63 is operated, the client control device 20 recognizes the designated plan.

In response to this, based on communication with the second client 2*b*, the server control device 10 recognizes the group ID of the group corresponding to the plan ID of the designated plan and then searches for the designated plan from the database 14 based on the group ID.

At the second client 2*b*, based on communication with the server 1, the client control device 20 recognizes the designated plan as a search result and then displays a secondary planning screen showing the designated plan on the touch panel. This screen includes, for example, meeting time and date, a departure-place icon P1, a destination icon P2, stopover icons POIk, and a route R (see FIG. 14).

At the second client 2*b*, the client control device 20 may differentiate the display modes of the stopover icons POIk depending on the differences in the attributes of the stopovers represented by the stopover icons POIk (see FIG. 13). At the second client 2*b*, if any of the departure-place icon P1, the destination icon P2, and the stopover icons POIk is operated, the information about the locational point represented by the designated icon may be displayed by text on the touch panel (see FIG. 13).

Returning to the explanations of FIG. 21, in response to an operation of the second user such as detection of pressing of the attendance/absence button M551 in the secondary planning screen, the client control device 20 of the second client 2*b* determines whether or not the second user is to attend (participate) the plan (FIG. 21/STEP 424).

If the determination result is positive (FIG. 21/STEP 424 . . . YES), the client control device 20 of the second client 2*b* displays, by an image display device of the output device 22, a first condition input screen (see FIG. 22) for inputting conditions for switching the mode of the application to a second mode (FIG. 21/STEP 426).

In combination with those described above, the client control device 20 of the second client 2*b* transmits the plan ID of this plan and the user ID of the second user to the server 1, thereby storing the plan ID and the user ID, which is registered to participate in the plan, in association with each other in the database 14 of the server 1.

The first condition input screen includes a time-zone-condition setting button M91 for setting switching of the mode of the application to a second mode depending on time zones, a notification-reception-condition setting button M92 for setting switching of the mode of the application to the second mode depending on reception of an event opening notification from an event host, a position-condition setting button M93 for setting switching of the mode of the application to the second mode depending on the position of the second user, and a first-condition registration button M94 for registering a first condition.

The first condition input screen further includes a start-time/date designating button M911 and an end-time/date designating button M912 for designating the time zone of the time-zone-condition setting button M91. The second user can designate the start time and date and the end time and date by operating the character keys (or calendar and clock) displayed on the touch panel.

When pressing of the first condition registration button M94 is detected, the client control device 20 of the second client 2b stores the input first condition in the storage device 24 in association with the plan ID, transmits them to the server 1, and stores the first condition in the database 14 in association with the user ID of the second user and the plan ID (FIG. 21/STEP 428).

After the process of FIG. 21/STEP 428 or if the determination result of FIG. 21/STEP 424 is negative (FIG. 21/STEP 424 . . . NO), the client control device 20 of the second client 2b terminates the first condition registration process.

(Talk-Screen Selection Process)

Next, a selection process of the talk screen will be explained with reference to FIG. 23 to FIG. 24. In the present explanations, the explanations will be given by taking, as an example, a case in which transmission of a message (new information) from the first user to the second client 2b of the second user who has registered the first condition for the plan (FIG. 4/STEP 220) triggers a transition to a talk screen.

Figure 23:
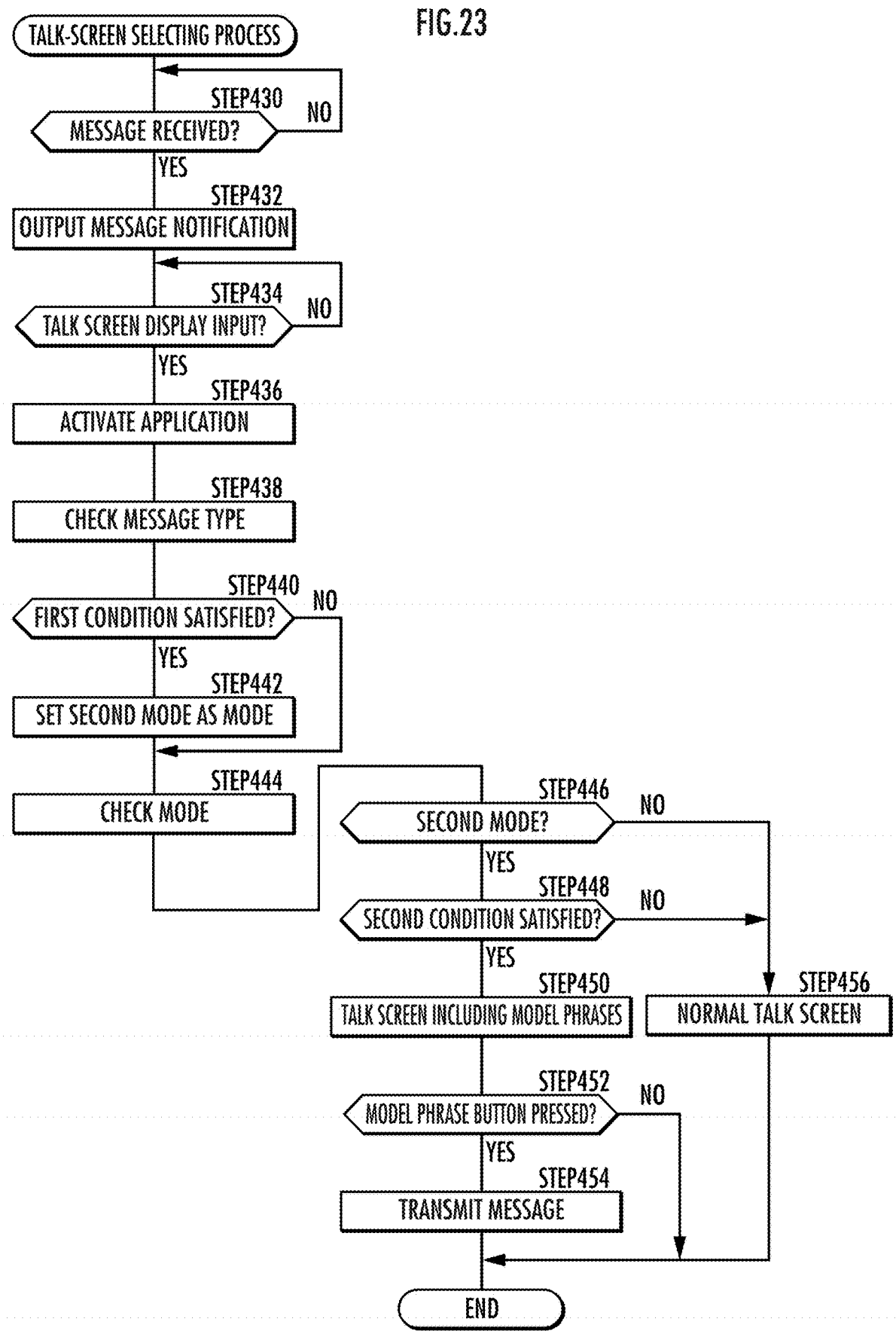
FIG. 23 is a flow chart of a talk-screen selecting process.
Figure 24:
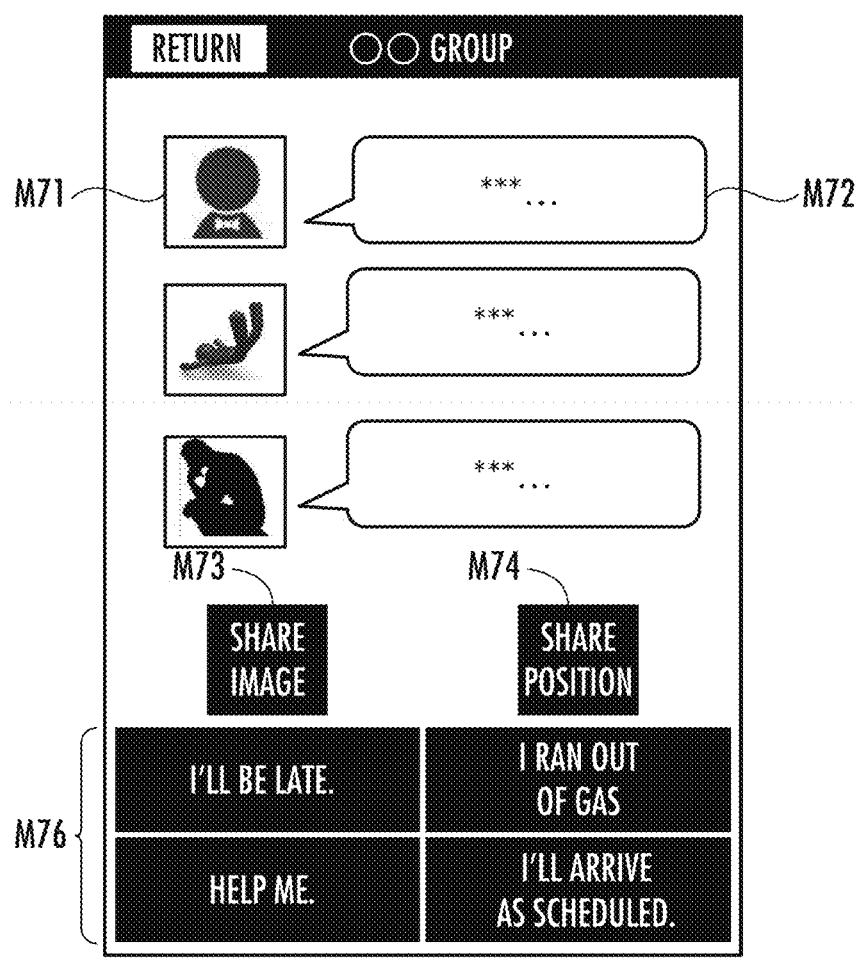
FIG. 24 is an explanatory drawing about a talk screen including model phrases.

The client control device 20 of the second client 2b determines whether or not a message (new information) has been received (FIG. 23/STEP 430). If the determination result is negative (FIG. 23/STEP 430 . . . NO), the client control device 20 of the second client 2b re-executes the process of FIG. 23/STEP 430.

If the determination result is positive (FIG. 23/STEP 430 . . . YES), the client control device 20 of the second client 2b outputs a reception notification of the message to the output device 22 (FIG. 23/STEP 432).

The client control device 20 of the second client 2b determines whether or not there is a talk screen display input such as pressing of a message display button by the second user (FIG. 23/STEP 434). If the determination result is negative (FIG. 23/STEP 434 . . . NO), the second user executes the process of FIG. 23/STEP 434 again.

If the determination result is positive (FIG. 23/STEP 434 . . . YES), the client control device 20 of the second client 2b activates the application (FIG. 23/STEP 436).

As a process of the application, the client control device 20 of the second client 2b acquires the type (text, picture, position information, etc.) of the received message (FIG. 23/STEP 438). In response to the type of the received message, the client control device 20 of the second client 2b appropriately switches a displayed message image.

The client control device 20 of the second client 2b determines whether or not the first condition registered in FIG. 21/STEP 426 to STEP 428 is satisfied (FIG. 23/STEP 440).

For example, if a time-zone condition is registered as the first condition in FIG. 21/STEP 426 to STEP 428, the client control device 20 of the second client 2b determines whether the current time shown by a clock function of the client control device 20 is after the start time and date and before the end time and date stored in the storage device 24 or the database 14, thereby judging whether or not the first condition is satisfied.

For example, if a notification-reception condition is registered as the first condition in FIG. 21/STEP 426 to STEP 428, the client control device 20 of the second client 2b determines whether or not an event opening notification from an event host (for example, the first user) has been received, thereby judging whether or not the first condition is satisfied.

For example, if a position condition is registered as the first condition in FIG. 21/STEP 426 to STEP 428, the client control device 20 of the second client 2b determines whether or not the current position of the second client 2b measured by the self-location measuring function is within a predetermined distance from a designated location such as the meeting place of the plan stored in the storage device 24 or the database 14, thereby determining whether or not the first condition is satisfied.

This first condition may be a condition stored in the storage device of the second client 2b or may be a condition searched in the server 1 based on the user ID of the second user.

The client control device 20 of the second client 2b may determine whether or not the first condition is satisfied by referencing a determination result of satisfaction or non-satisfaction of the first condition of the second user by the server control device 10 of the server 1.

If the determination result is positive (FIG. 23/STEP 440 . . . YES), the client control device 20 of the second client 2b sets the mode of the application to the second mode (FIG. 23/STEP 442).

If the determination result is negative (FIG. 23/STEP 440 . . . NO) or after the process of FIG. 23/STEP 442, the client control device 20 of the second client 2b checks the mode of the application (FIG. 23/STEP 444).

The client control device 20 of the second client 2b determines whether or not the checked mode of the application is the second mode (FIG. 23/STEP 446).

If the determination result is positive (FIG. 23/STEP 446 . . . YES), based on a user ID of the sender (first user) of the message, the client control device 20 of the second client 2b determines whether or not a second condition that the user ID is associated with the plan ID is satisfied (FIG. 23/STEP 448).

If the determination result is positive (FIG. 23/STEP 448 . . . YES), the client control device 20 of the second client 2b displays a talk screen including model phrase buttons M76 (second information) shown in FIG. 24 (FIG. 23/STEP 450).

The model phase buttons M76 include display of model phrases (first information) such as "I'll be late.", "I ran out of gas.", "Help me.", and "I'll arrive as scheduled." related to the plan specified by the plan ID. In response to detection of pressing of the model phrase button M76 (FIG. 23/STEP 452 . . . YES), the client control device 20 of the second client 2b transmits a model phrase (first information), which is included in the model phrase button M76 and related to the plan, to the server 1 (FIG. 23/STEP 454).

If the determination result of FIG. 23/STEP 446 or FIG. 23/STEP 448 is negative (FIG. 23/STEP 446 . . . NO or FIG. 23/STEP 448 . . . NO), the client control device 20 of the second client 2b displays a talk screen including the character keys shown in FIG. 16 (FIG. 23/STEP 456). In this screen, as described above, the client control device 20 of the second client 2b transmits appropriate information to the server 1 in response to, for example, operations of the character keys.

If the determination result of FIG. 23/STEP 452 is negative (FIG. 23/STEP 452 . . . NO), the client control device 20 of the second client 2b terminates the talk screen selection process after the process of FIG. 23/STEP 454 or after the process of FIG. 23/STEP 456.

(Effects)

According to the server 1 and the client 2 of the present invention and the information sharing system constituted by them, a plan determined by a first member (first user) through the first client 2a can be informed to another member (second user) belonging to the same group through the second client 2b (see FIG. 3). As a result, after the second user perceives a route of which calculation is requested to the server 1 by the first user, a stopover(s) serving as a basis of the calculation, the attribute of the stopover, and the information related to the stopover, participation or non-participation in the plan of the group created by the first user can be determined.

In response to a request sent from the first member (first user) through the first client 2a, the current location of the first member can be informed to the another member (second user) who belongs to the same group through a map displayed by the second client 2b (see FIG. 4 and FIG. 17 to FIG. 20).

Furthermore, since messages can be exchanged among the users belonging to the same group, communication about the plan is carried out (see FIG. 16). As a result, the communication among the plurality of members about the plan determined by the route or the latest situations of the members is facilitated.

According to the client 2 of this configuration, if it is determined that the first condition is satisfied (FIG. 23/STEP 440 . . . YES), the second mode is set as the mode of the application; and, in a case of the second mode, the model phrase buttons M76 (see FIG. 24) including the model phrases are displayed on the image display device instead of the character keys M75 (see FIG. 16). Since the own user can send the first information more easily than the case in which it is determined that the first condition is not satisfied (FIG. 23/STEP 440 . . . NO), sharing of information in the case in which the predetermined conditions are satisfied is facilitated.

According to the client 2 of this configuration, since the first information can be easily sent in the time zone (start time to end time) in which information sharing is expected to be carried out, information sharing is facilitated.

According to the client 2 of this configuration, together with the new information (message) sent from the second client 2, the second information (model phrase buttons M76) for causing the own user to recognize that the first information (model phrase) associated with the input mode can be sent by the predetermined input mode is output. In other words, the additional information (second information) other than the information (new information) to be shared is output together with the information (new information) to be shared; therefore, troublesomeness given to the own user can be reduced or eliminated compared with the case in which they are separately output.

According to the client 2 of this configuration, since the buttons (model phrase buttons M76) including the first information (model phrases) are output (displayed) together with the new information (message), the own user can recognize, together with the new information, that the first information can be sent by selecting the button. As a result, the troublesomeness given to the own user can be reduced or eliminated.

According to the client 2 of this configuration, since the condition set by the own user or the another user is used as the first condition, the intention of the own user or the another user is taken into consideration in determination of satisfaction or non-satisfaction of the first condition. As a result, information sharing is facilitated.

According to the client 2 of this configuration, if the user ID of the second user is associated with the plan ID (FIG. 23/STEP 448 . . . YES), the second information (model phrase buttons M76) for causing the own user to recognize that the first information (model phrases) can be sent is output.

In other words, if the probability that the new information sent from the second user is related to group actions is high, the second information for easily sending the first information is output; therefore, the troublesomeness given to the own user can be reduced or eliminated.

Other Embodiments of the Present Invention

In the above described embodiment, the route is calculated by the server control device 10 in the server 1 (see FIG. 3/STEP 108). However, the route may be calculated by the client 2, and the plan including the calculated route may be registered in the database 14 in response to plan acceptance at the client 2 (see FIG. 3/STEP 214 to STEP 110).

In the above described embodiment, the map M8 including the icon M81 representing the first user serving as the transmission source of the position sharing request is displayed on the touch panel of the client 2 of the second user belonging to the same group (see FIG. 17). However, the map M8 further including an icon M82 representing the second user may be displayed on the touch panel. For example, in the position sharing screen, as shown in FIG. 18, the icon M82 representing the user of the first client 2a may be displayed at a corresponding position. The scale size of the map M8 may be automatically adjusted by the client control device 20 so as to enable this display.

Figure 19:
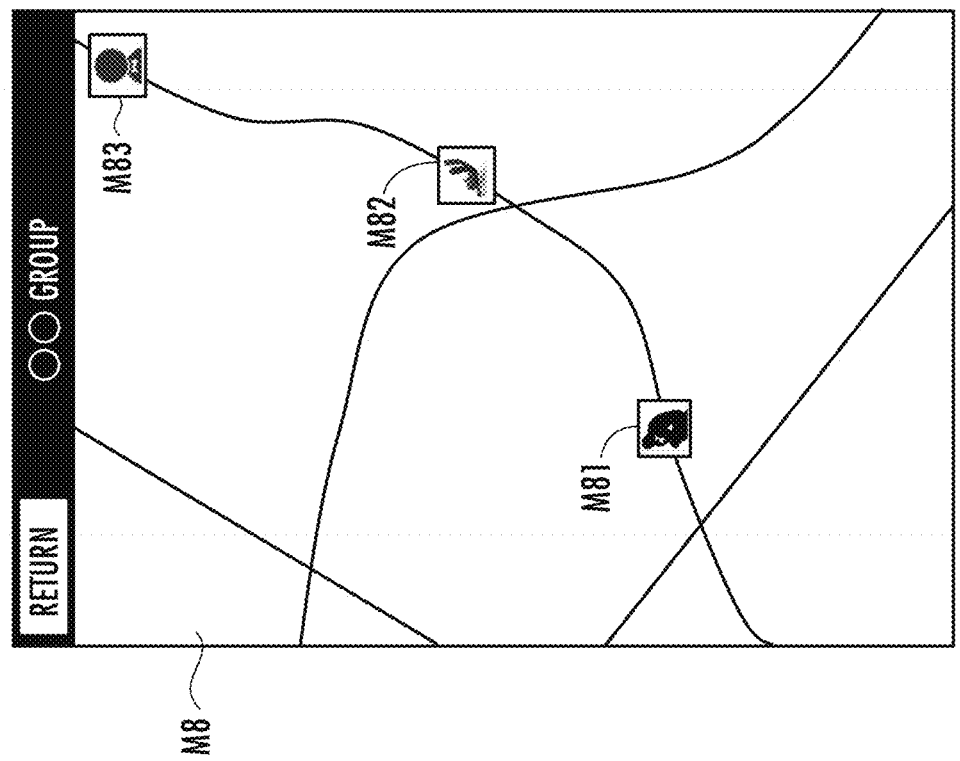
FIG. 19 is an explanatory drawing about a third example of a position sharing screen.

In response to the fact that position sharing has been requested, a map including the icons representing all the other users belonging to the same group in addition to the icon M81 representing the first user may be displayed on the touch panels of the clients 2 of the other users. Specifically, based on communication between the server 1 and the second clients 2b of all the respective second users belonging to the same group as the first user serving as the transmission source of the request, the server control device 10 recognizes the respective positions of the second users. Based on communication between the server 1 and the second client 2b, for example as shown in FIG. 19, the server control device 10 displays, on the touch panel of the second client 2b, a position sharing screen in which the icon M81 representing the first user, the icon M82 representing the second user, and an icon M83 representing a third user are shown on the map M8. In the example shown in FIG. 19, the position of the icon M81 representing the first user is adjusted to be deviated from the center of the map M8. As a result, the scale size of the map M8 is maintained to a predetermined value or more.

Figure 20:
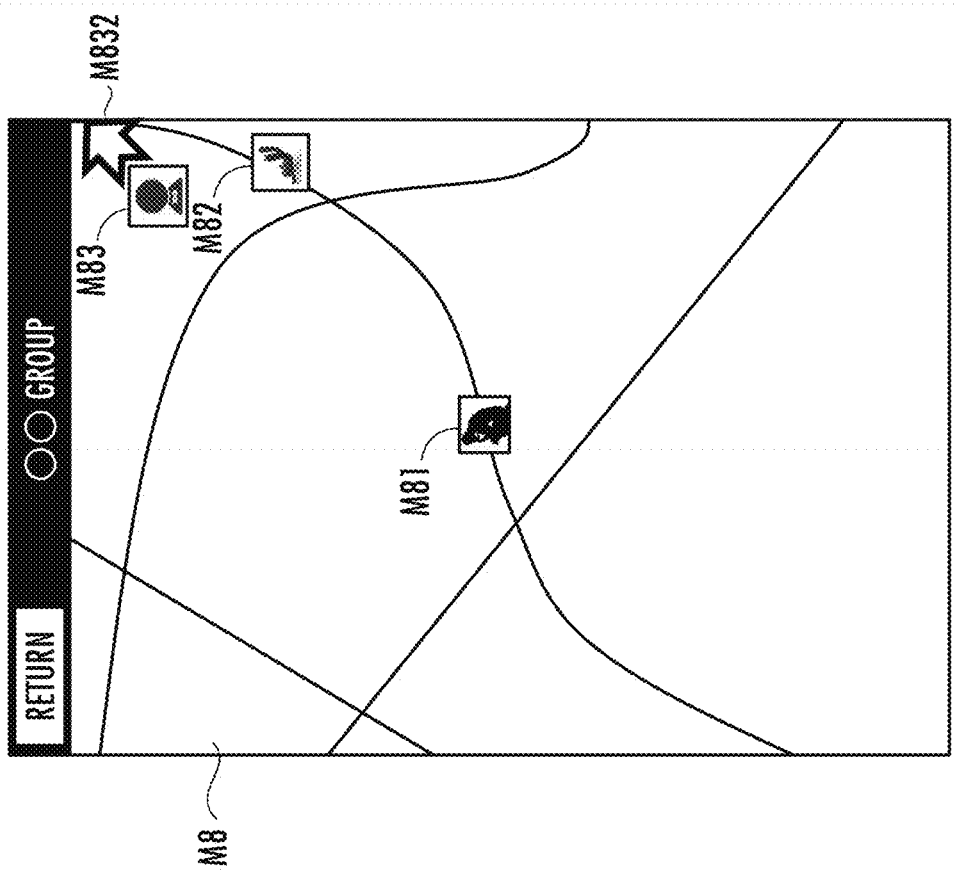
FIG. 20 is an explanatory drawing about a fourth example of a position sharing screen.

From the viewpoint of maintaining the scale size of the map M8 to the predetermined value or more, if it is difficult to display all the icons, which represent the group members, at the corresponding parts of the map M8, for example as shown in FIG. 20, the icon M83 representing the user at a location deviated from the display range of the map M8 and an icon M832 showing the deviation direction may be displayed on the touch panel.

In the first condition registration process of the present embodiment, reception of the plan invitation message by the second client 2b of the second user (FIG. 21/STEP 420 . . . YES) serves as a trigger to carry out the plan first condition registration; however, the plan invitation message is not necessarily required to be received. For example, after a transition is made from the feed screen (FIG. 15) to the secondary planning screen (FIG. 14), the processes of FIG. 21/STEP 424 and thereafter may be executed.

In the talk-screen selecting process of the present embodiment, reception of the message sent from another client (FIG. 23/STEP 430 . . . YES) triggers to carry out talk screen selection. However, the message sent from the another client is not necessarily required to be received, and, for example, after the application is voluntarily activated by the user, the process of FIG. 23/STEP 438 and thereafter may be executed.

In the talk-screen selecting process of the present embodiment, on the condition that the first condition is satisfied (FIG. 23/STEP 440 . . . YES), the mode of the application is set to the second mode (FIG. 23/STEP 442); and, on the condition that the mode of the application is the second mode (FIG. 23/STEP 446 . . . YES), the talk screen including the model phrases is displayed (FIG. 23/STEP 450). However, instead of this, on the condition that the first condition is satisfied, the talk screen including the model phrases may be displayed.

In the talk-screen selecting process of the present embodiment, satisfaction or non-satisfaction of the first condition registered by the user is determined (FIG. 23/STEP 440). However, instead of this, for example, based on the condition (start time, end time) set in the plan creation screen by a member (for example, the first user) such as an event host who is other than the user and participating in the plan, satisfaction or non-satisfaction of the first condition may be determined.

In the talk-screen selecting process of the present embodiment, whether the user is in a particular state or not is determined by determining satisfaction or non-satisfaction of the first condition registered by the user (FIG. 23/STEP 440). However, instead of this, for example, based on disaster information received from outside, the position information of the user (client 2) measured by the positioning function of the client 2, and the elapsed time from a disaster calculated from the disaster information and the current time measured by a time function of the client 2, for example whether or not the first condition set in advance by a seller of the client is satisfied may be determined.

In the talk-screen selecting process of the present embodiment, as the predetermined input mode having the small number of times of input with respect to the input device, a mode of pressing the model phrase button M76 including the model phrase related to the plan is employed. However, in addition to this or instead of this, for example, an input mode having a small information quantity to be input such as a predetermined sound message associated with a model phrase may be employed.

In the present embodiment, the client control device 20 of the client 2 determines whether or not the first condition is satisfied. However, instead of this, based on the first condition stored in the database 14, the server control device 10 of the server 1 may determine whether or not the first condition is satisfied for each of the members participating in the plan.

In this case, if the server control device 10 of the server 1 determines that the first condition of one member is satisfied, by a predetermined input mode having a smaller number of times of input or a smaller information quantity to be input with respect to the input device 21 provided at the client 2 used by the member than those of the case in which the member is determined that the first condition is not satisfied, an order for causing the input device 21 to function as an input interface for sending predetermined first information associated with the predetermined input mode may be transmitted to the client 2 used by the member.

In the server 1, the server control device 10 is preferred to be configured to store the condition for starting the plan, which is received from the client 2 of the member having the user ID associated with the plan ID, in the database 14 as a first condition.

In the server 1 of this configuration, the server control device 10 is preferred to be configured to transmit an image (see FIG. 22) for causing the user to designate the condition for starting the plan to the client 2 when the registration of participation in the plan by the user of the client 2 is received.

Second Embodiment

Figure 25:
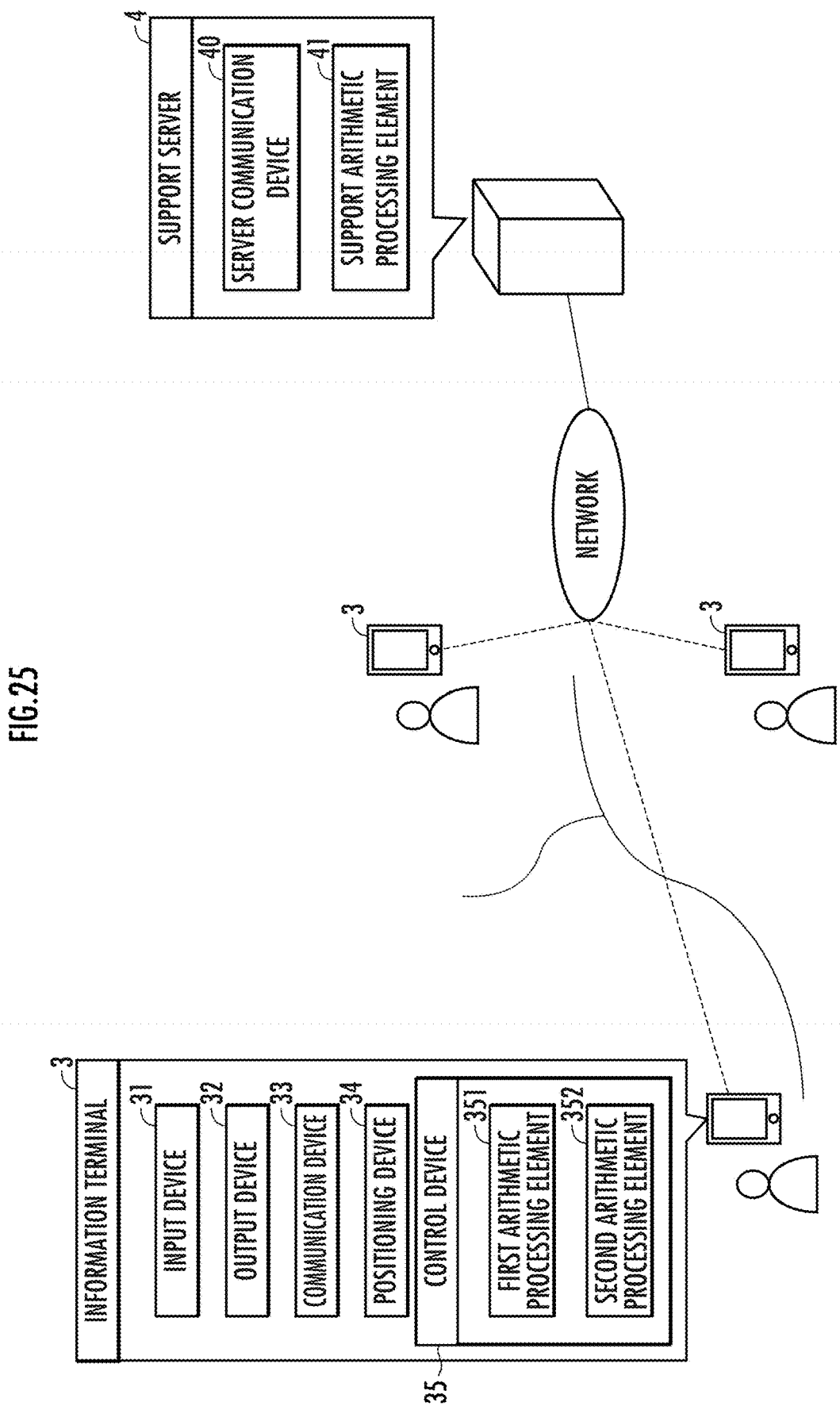
FIG. 25 is an overall configuration diagram of an information sharing system of a second embodiment.

An information sharing system as a second embodiment of the present invention shown in FIG. 25 consists of a plurality of information terminals 3 (corresponding to "clients" of the present invention), which can be mutually communicated via a network, and a support server 4 (corresponding to "external equipment" and "server" of the present invention).

When the information sharing system of the present invention is used in events such as touring and walking, information sharing among participants who participate in the events may be promoted.

The information terminal 3 consists of any information terminal such as a tablet-type terminal or a smartphone that has a size, a shape, and a weight so that it can be carried by a user. The information terminal 3 comprises an input device 31, an output device 32, a communication device 33, a positioning device 34, and a control device 35. The information terminal 3 may function as "first client" or "second client" of the present invention.

The information terminal 3 may be carried by a user or may be mounted on a movable body the user is boarding.

The input device 31 consists of a position input device, which constitutes a touch panel. The input device 31 may additionally consist of a sound input device (microphone). The input device 31 may consist of a detection device such as an image taking device which detects the modes of input operations (speech contents or gestures) of the user by a non-contact method. The output device 32 consists of an image display device such as a liquid crystal panel or an organic EL constituting a touch panel. The output device 32 may additionally consist of a sound output device (speaker). The communication device 33 has a function to transmit/receive various information to/from the support server 4. The positioning device 34 consists of a GPS and, in accordance with needs, a gyro sensor, etc., and the information terminal 3 has a function to measure the current locational point (latitude/longitude) by that.

The control device 35 consists of a computer (comprising an arithmetic processing device and a storage device). A touring application (corresponding to "information sharing program" of the present invention) is installed in the control device 35. The touring application causes the control device 35 to function as a first arithmetic processing element 351 and a second arithmetic processing element 352, which are configured to execute later-described arithmetic processing.

The first arithmetic processing element 351 and the second arithmetic processing element 352 are configured to change processing contents in accordance with a control mode defined by the touring application. The touring application, for example, operates the control device 35 in a touring mode (corresponding to "first mode" of the present invention) on the condition that it is from start scheduled time to end scheduled time included in a later-described plan and operates the control device 35 in a normal mode (corresponding to "second mode" of the present invention) on the condition that it is not within the time zone from the start scheduled time to the end scheduled time.

The support server 4 comprises a support arithmetic processing element 41, which carries out various processing in response to requests of the information terminals 3, in addition to a server communication device 40. The support server 4 has a function to transmit/receive various information to/from the information terminals 3 by the server communication device 40.

The expression that a constituent element of the present invention is configured to execute information arithmetic processing means that the arithmetic processing device, which is the constituting element of the control device, is designed or programmed to read a program and necessary information from a storage device (memory) and execute the information arithmetic processing in accordance with the program.

The support server 4 may consist of a plurality of servers which can be mutually communicated. Part or all of the support server 4 may consist of equipment (am electronic unit, a computer, or the like) mounted on a vehicle or the information terminal 3.

Hereinafter, users (holders) of the information terminals 3, which are explanation targets, will be referred to as "users", and constituent members of a group formed by the touring application will be referred to as "group members", and participants of one event will be referred to as "participant members". The participant members correspond to "members" of the present invention, and an assemblage formed by the participant members correspond to "assemblage" of the present invention.

In a later-described display process of images, the first arithmetic processing element 351 is configured to display images including predetermined setting information, which is stored in a storage device (not shown) of the information terminal 3 and latest information, which is recognized from the support server 4.

The second arithmetic processing element 352 is configured to periodically communicate with the support server 4, recognize predetermined information, and store that in the storage device (not shown) of the information terminal 3. If the control mode is the touring mode, the second arithmetic processing element 352 periodically recognizes more information (for example, information about the presence/absence of later-described change of plan) than that in a case in which the control mode is a normal mode.

(Touring-Case Information-Sharing Support Image Displaying Function)

Figure 26A:
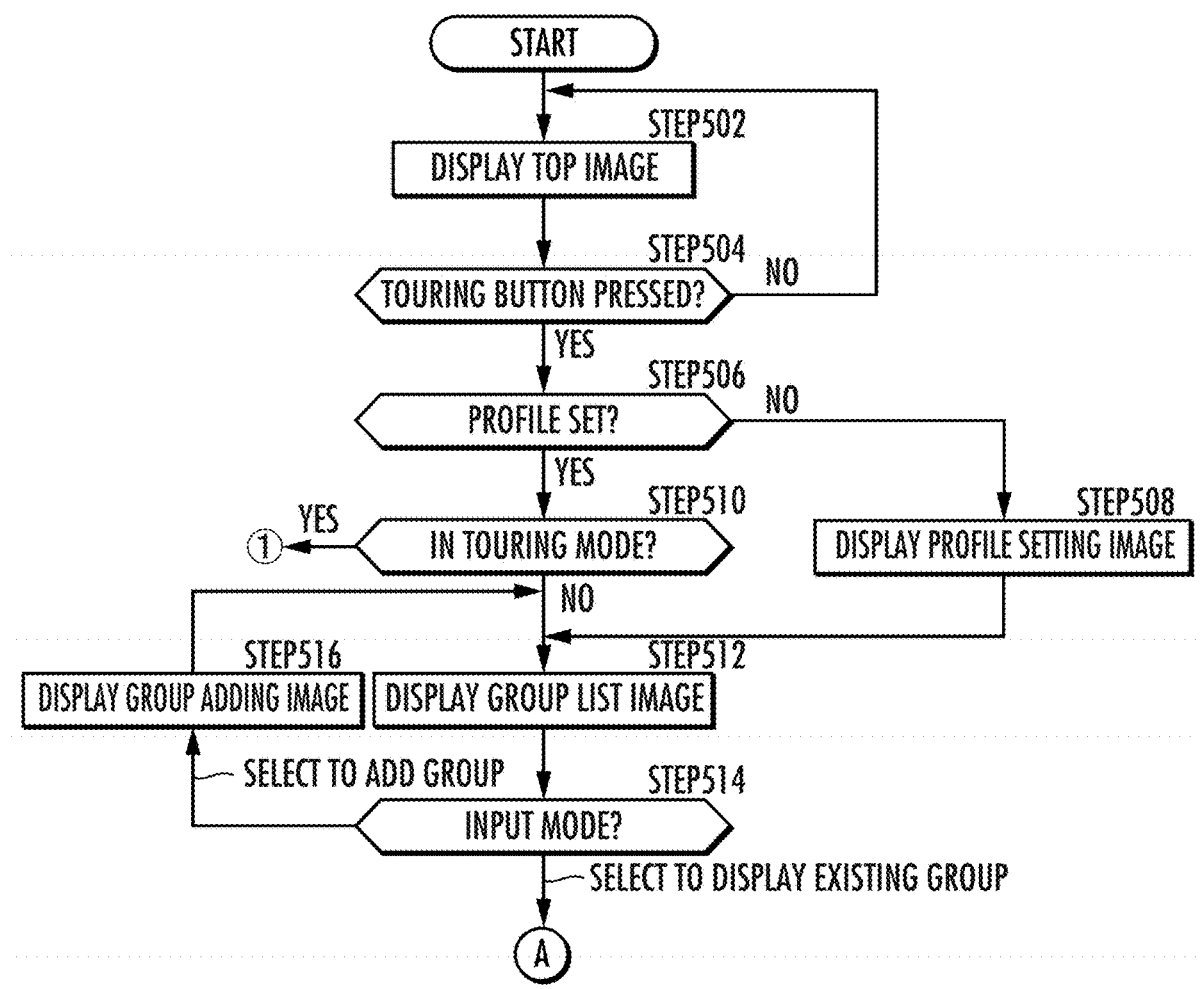
FIG. 26A is a flow chart showing a first-half process of an information sharing process of the second embodiment.
Figure 26B:
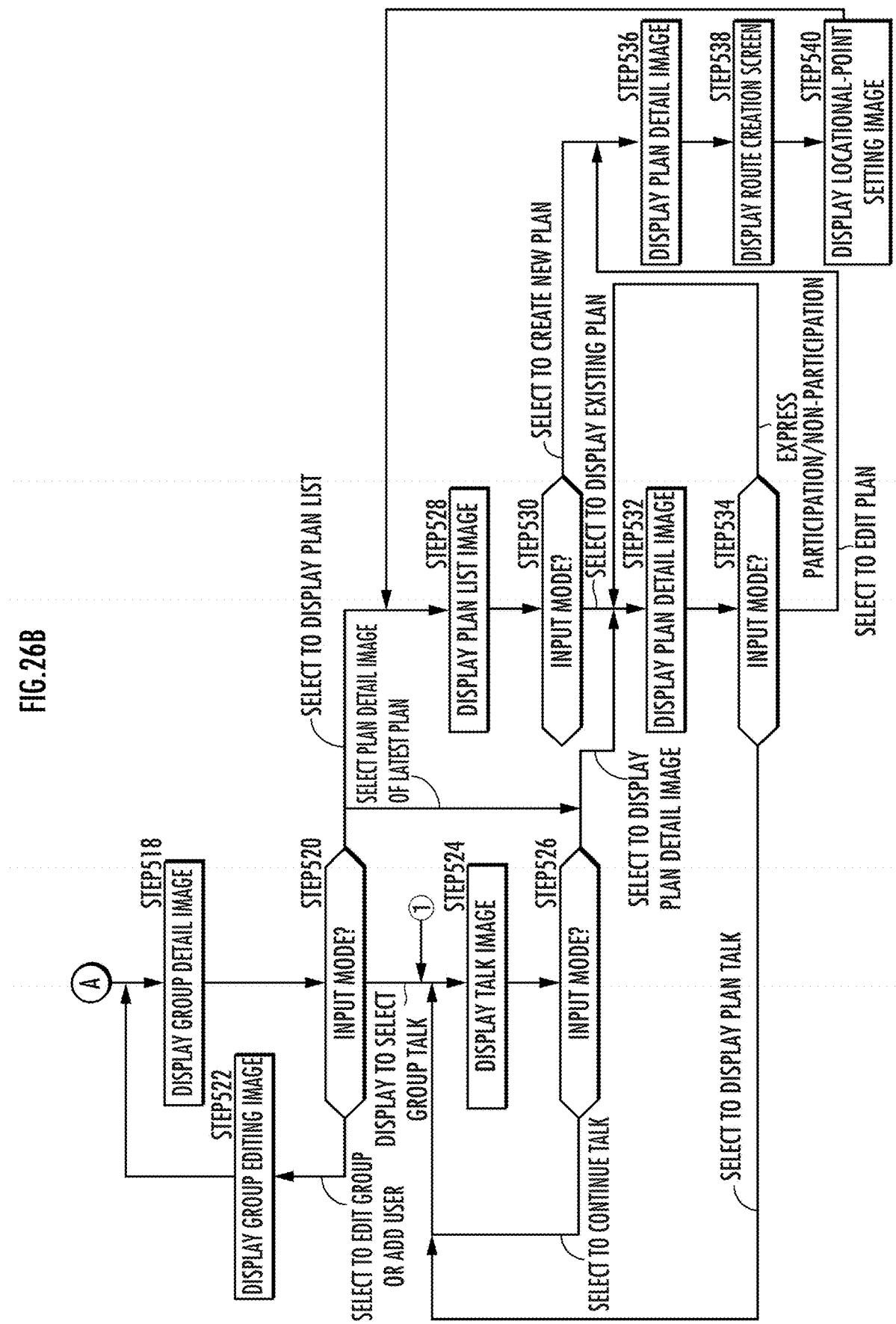
FIG. 26B is a flow chart showing a second-half process of the information sharing process of the second embodiment.

Next, with reference to FIG. 26A to FIG. 29C, a touring-case information-sharing support image displaying process executed by the first arithmetic processing element 351 of the information terminal 3 will be explained. FIGS. 26A and 26B only show overall flows of the image displaying process, and illustration of detailed processing such as communication processing with the support server 4 is omitted.

When the touring application is activated, the first arithmetic processing element 351 displays a top image P1 of the touring application shown in FIG. 27A or FIG. 27B by the output device 32 (FIG. 26A/STEP 502).

The top image P1 includes a user-name display P11, a travel-distance display P12 showing a travel distance, and buttons P13 for executing predetermined functions. If the control mode is the touring mode, as shown in FIG. 27B, the top image P1 further includes a mode display P14 showing that it is in the touring mode.

In the present embodiment, as the buttons P13: a navigation button P13a for displaying a navigation image P8 (see FIG. 31), which carries out navigation, by the output device 32; a history button P13b of fuel cost, etc. for displaying a fuel cost (electricity cost) history; a weather information button P13c for displaying weather information (local information of rainfall and snowfall); a parking-area search button P13d for searching for a nearest parking area; a shop search button P13e for searching for a shop of a movable body used by the user; a socializing button P13f for socializing by the touring application users; a fueling button P13g for searching for a nearest fuel sharing (electricity supplying) facility; a touring button P13h for displaying touring-case information-sharing support images P2 to P7 (see FIG. 28A to FIG. 29C); and a 1-to-1 button P13i for carrying out 1-to-1 communication with another user of the touring application, are employed.

The first arithmetic processing element 351 determines whether or not an input mode detected via the input device 31 is a mode selecting displaying of a touring support screen such as pressing of the touring button P13h (FIG. 26A/STEP 504).

If the result of this determination is negative (FIG. 26A/STEP 504 . . . NO), the first arithmetic processing element 351 continues displaying the top image P1 by the output device 32 (FIG. 26A/STEP 502) or carries out processing corresponding to the input mode, for example, carries out processing corresponding to pressing of another button (illustration omitted).

If the result of this determination is positive (FIG. 26A/STEP 504 . . . YES), via communication with the support server 4, the first arithmetic processing element 351 determines whether or not the profile of the user is set (whether or not profile information of the user is saved in the support server 4) (FIG. 26A/STEP 506).

If the result of this determination is negative (FIG. 26A/STEP 506 . . . NO), the first arithmetic processing element 351 displays a screen for causing the user to input profile information of the user (FIG. 26A/STEP 508), transmits the information input by the screen to the support server, and then proceeds to FIG. 26A/STEP 512.

If the result of this determination is positive (FIG. 26A/STEP 506 . . . YES), the first arithmetic processing element 351 determines whether or not the control mode is in the touring mode (STEP 26A/STEP 510).

If the result of this determination is positive (FIG. 26A/STEP 510 . . . YES), the first arithmetic processing element 351 proceeds to FIG. 26B/STEP 524.

If the result of this determination is negative (FIG. 26A/STEP 510 . . . NO), the first arithmetic processing element 351 proceeds to FIG. 26A/STEP 512.

Figure 28B:
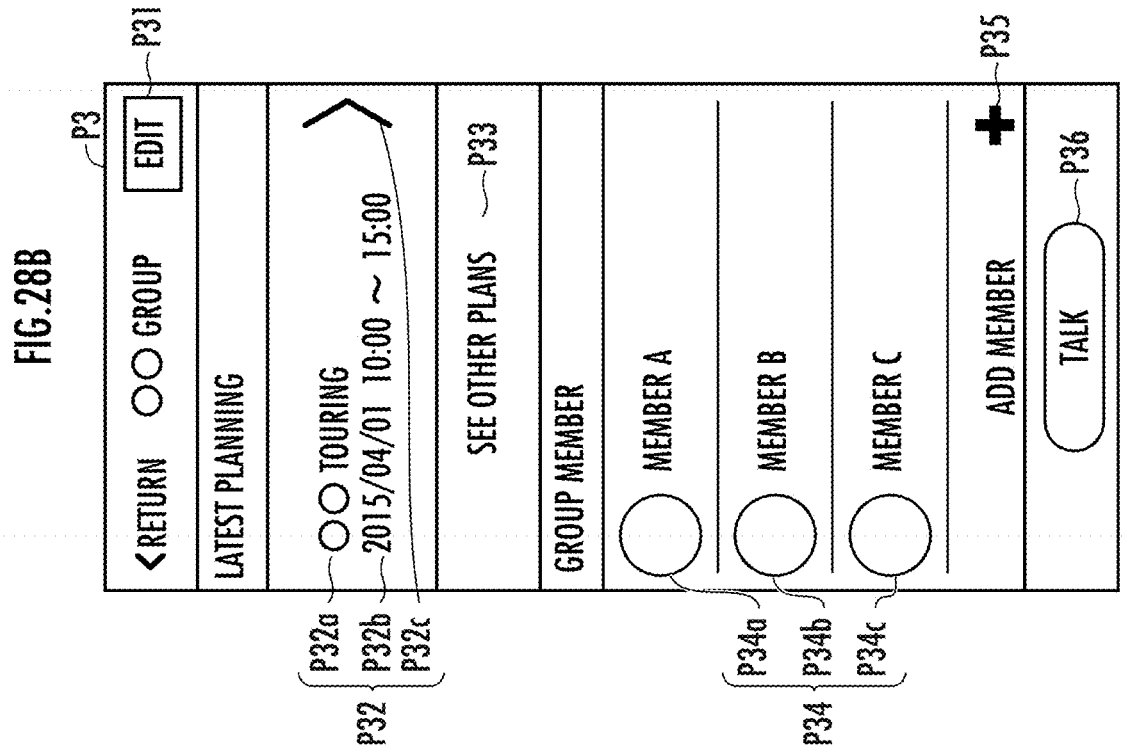
FIG. 28B is a drawing explaining a configuration of a group detail screen.
Figure 28A:
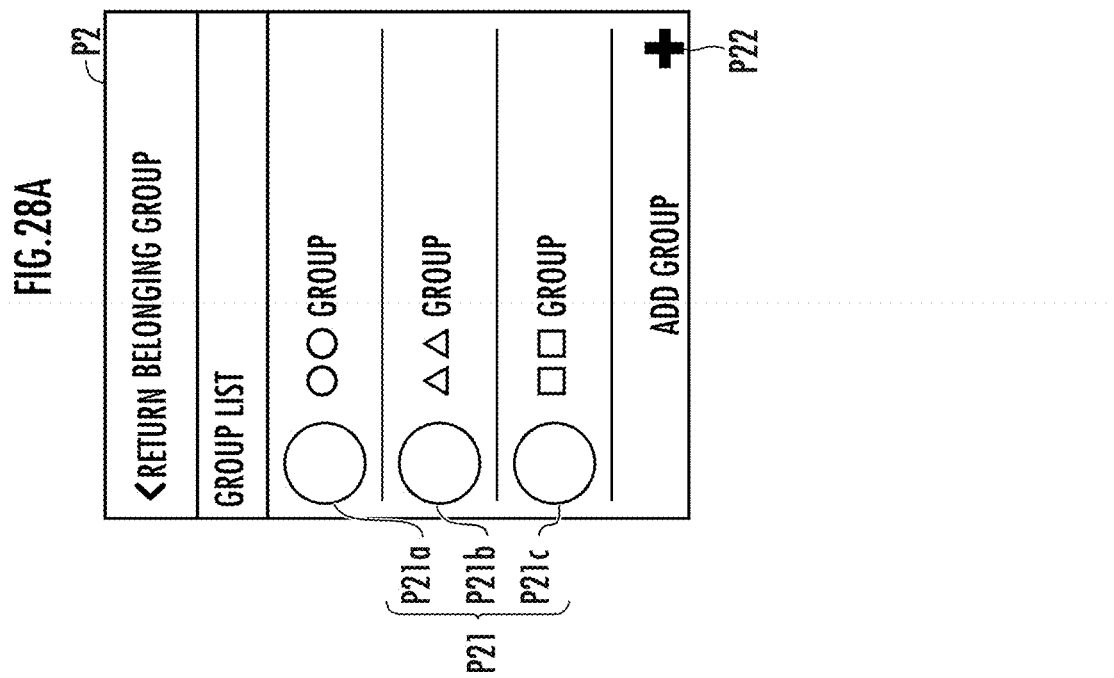
FIG. 28A is a drawing explaining a configuration of a group list screen.

In FIG. 26A/STEP 512, the first arithmetic processing element 351 causes the output device 32 to display a group list image P2 shown in FIG. 28A. The group list image P2 includes a list display P21 of the groups which are acquired by the support server 4 or stored in the control device 35 and to which the user belongs, and includes a link image P22 for adding a group.

The list display P21 of the groups include images P21a to P21c respectively representing the groups to which the user belongs.

The first arithmetic processing element 351 determines what input mode is the input mode of the user detected via the input device 31 (FIG. 26A/STEP 514).

If the input mode of the user detected via the input device 31 is the mode that selects group addition such as pressing of the link image P22 (FIG. 26A/STEP 514 . . . "SELECT GROUP ADDITION"), the first arithmetic processing element 351 causes the output device 32 to display a group addition image for inputting information for adding a group (FIG. 26A/STEP 516), transmits the information input by the user to the support server 4, and then proceeds to FIG. 26A/STEP 512.

In a case in which the input mode of the user detected via the input device 31 in the state in which the group list image P2 is displayed by the output device 32 is the mode that selects existing group display such as pressing of any of the images P21a to 21c (FIG. 26A/STEP 514 . . . "SELECT EXISTING GROUP DISPLAY"), the first arithmetic processing element 351 causes the output device 32 to display a group detail image P3 shown in FIG. 28B (FIG. 26B/STEP 518).

The group detail image P3 includes: a group editing button P31 linked to a group editing image; a latest plan information display P32, which is a display of an outline of latest plan information of the group; a link image P33 for displaying a plan list image P5 (see FIG. 29A) including latest plan information; a group-member list information display P34 for displaying a list of group member information; a link image P35 linked to a group member adding image; and a group talk button P36 linked to a talk image P4 (see FIG. 28C) of the group.

Note that the plan information corresponds to "first information" of the present invention.

Figure 29A:
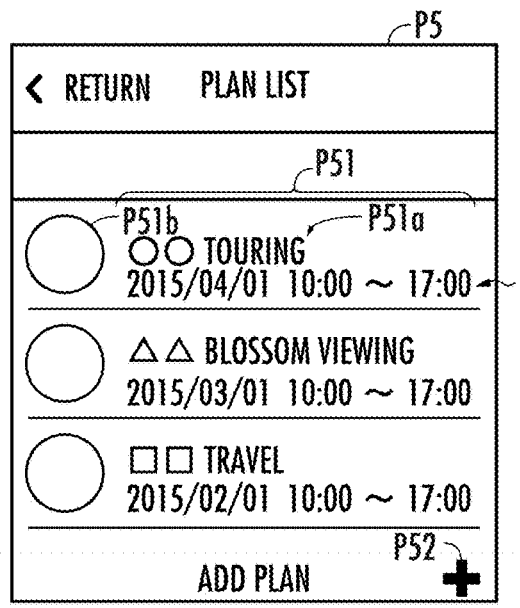
FIG. 29A is a drawing explaining a configuration of a plan list screen.
Figure 29B:
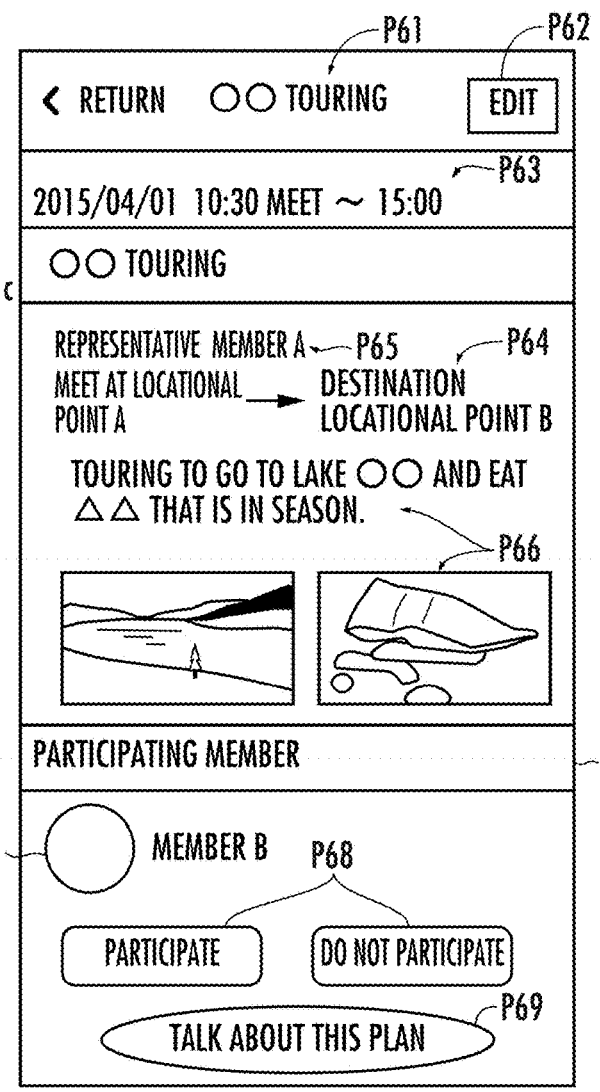
FIG. 29B is a drawing explaining a configuration of a plan detail screen.

The latest plan information display P32 includes a plan name display P32a which displays a plan name, a time display P32b which displays start scheduled time and end scheduled time of the plan, and a mark P32c which is linked to a plan detail image P6 (corresponding to "first information image" of the present invention) of a latest plan (see FIG. 29B).

In the state in which the group detail image P3 is displayed by the output device 32, the first arithmetic processing element 351 determines what input mode is the input mode of the user detected via the input device 31 (FIG. 26B/STEP 520).

If the input mode of the user detected via the input device 31 is the mode that selects group editing or user adding such as pressing of the group editing button P31 or the link image P35 (FIG. 26B/STEP 520 . . . "SELECT TO EDIT GROUP OR ADD USER"), the first arithmetic processing element 351 causes the output device 32 to display a group editing image or a group-member adding image to input information for editing the group information (FIG. 26B/STEP 522), transmits the information input at the image by the user to the support server 4, and then proceeds to FIG. 26B/STEP 518.

If the input mode of the user detected via the input device 31 is the mode that selects a plan list display such as pressing of the link image P33 (FIG. 26B/STEP 520 . . . "SELECT TO DISPLAY PLAN LIST"), the first arithmetic processing element 351 proceeds to FIG. 26B/STEP 528.

If the input mode of the user detected via the input device 31 is the mode that selects to display a plan detailed image of the latest plan such as pressing of the mark P32c (FIG. 26B/STEP 520 "SELECT PLAN DETAIL IMAGE OF LATEST PLAN"), the first arithmetic processing element 351 proceeds to FIG. 26B/STEP 532.

If the input mode of the user detected via the input device 31 is the mode that selects a group talk display such as pressing of the group talk button P36 (FIG. 26B/STEP 520 . . . "SELECT TO DISPLAY GROUP TALK"), the first arithmetic processing element 351 proceeds to FIG. 26B/STEP 524.

In FIG. 26B/step 524, based on the information recognized by communicating with the support server 4, the first arithmetic processing element 351 causes the output device 32 to display the talk image P4 (corresponding to "second information image" of the present invention) shown in FIG. 28C.

The first arithmetic processing element 351 of each of the information terminals 3 of talk participants recognizes the information common to the talk participants by communicating with the support server 4. For example, if the talk image is displayed by selecting a group talk in FIG. 26B/step 520, the first arithmetic processing element 351 of each of the information terminals 3 of the talk participants recognizes the information about the group talk by communicating with the support server 4.

The talk image P4 includes a talk updating button P41 for updating talk information, a speech display P42 which displays speech contents (corresponding to "second information" of the present invention) of the talk participants, and a speech button group P43.

Among them, at least the speech display P42 is created based on the information recognized by communicating with the support server 4.

The speech display P42 includes a name display P42a which displays a name or a nickname of a speaker, a speech time display P42b which displays the time at which the speech is made, a picture or an icon P42c showing the speaker, and a display P42d of the speech contents thereof.

Speeches are preferred to be displayed in time series. The background color of the display P42d of the speech contents may be changed for each speaker. In that case, the name display P42a may be omitted for the speeches of the users. New speeches are preferred to be displayed in a certain direction such as in a downward direction or an upward direction of the screen of the output device 32.

As the contents sent from the talk participants, the speech contents include, for example, a message P42d1 spoken via the speech button group P43, a picture P42d2 input by the talk participant, a position information (map information) P42d3 of the information terminal 3 at the point of the speech, or a link P42d4 to the later-described plan detail image.

Each of the members may be enabled to edit the contents of the speech of himself/herself by causing the display P42d of the speech contents to include an edit button for editing the speech in the speech of the user. However, at least, the contents of the speeches by the other members are configured to be not editable (edit buttons are not displayed in the speech fields of the other members).

The speech button group P43 includes a model phrase button P43a for sending a model phrase and/or a model image such as a greeting, a position information button P43b for sending the current position information of the information terminal 3, a picture button P43c for sending a picture, and keyboard buttons P43d for creating and sending phrases other than model phrases.

In the state in which the talk image P4 is displayed by the output device 32, the first arithmetic processing element 351 determines what input mode is the input mode of the user detected via the input device 31 (FIG. 26B/STEP 526).

If the input mode of the user detected via the input device 31 is the input mode that selects talk continuation such as pressing of the talk updating button P41 or pressing of the button P43a to 43d (FIG. 26B/STEP 526 . . . "SELECT TO CONTINUE TALK"), the first arithmetic processing element 351 carries out processing corresponding to the input mode of the user, for example, transmits an update request or speech contents to the support server 4, and then proceeds to FIG. 26B/STEP 524.

In addition to the speech contents, the first arithmetic processing element 351 is configured to transmit the position information of the information terminal 3, which has been recognized via the positioning device 34, to the support server 4 in combination therewith.

Even if there is no input by the user, based on predetermined setting, the first arithmetic processing element 351 may transmit the position information of the user according to the periodically recognized output of the positioning device 34, an image taken by the image taking device, or the information of a surrounding environment of the information terminal 3 such as weather information to the support server 4 as speech contents of the user.

If the input mode of the user detected via the input device 31 is a mode that selects to display a plan detail image such as pressing of the link P42d4 to the plan detail image, a predetermined flicking operation, or a predetermined sound input (FIG. 26B/STEP 526 . . . "SELECT TO DISPLAY PLAN DETAIL IMAGE"), the first arithmetic processing element 351 proceeds to FIG. 26B/STEP 532.

In FIG. 26B/STEP 528, based on the information recognized via the communication from the support server 4, the first arithmetic processing element 351 causes the output device 32 to display the plan list image P5 shown in FIG. 29A.

The plan list image P5 includes a plan list display P51, which displays outlines of plan information by a list, and a plan adding button P52, which is linked to a plan creation image P7 (see FIG. 29C).

The plan list display P51 includes, for each plan, a plan name display P51a displaying a plan name of the plan, a plan representing picture P51b displaying a representing picture of the plan, a time display P51c displaying start scheduled time and end scheduled time of the plan.

In the state in which the plan list image P5 is displayed by the output device 32, the first arithmetic processing element 351 determines what input mode is the input mode of the user detected via the input device 31 (FIG. 26B/STEP 530).

If the input mode of the user detected via the input device 31 is the mode that selects to display an existing plan such as pressing of the plan name display P51a (FIG. 26B/STEP 530 . . . "SELECT TO DISPLAY EXISTING PLAN"), the first arithmetic processing element 351 proceeds to FIG. 26B/STEP 532.

If the input mode of the user detected via the input device 31 is the mode that selects to create a new plan such as pressing of the plan adding button P52 (FIG. 26B/STEP 530 . . . "SELECT TO CREATE NEW PLAN"), the first arithmetic processing element 351 proceeds to FIG. 26B/STEP 536.

In FIG. 26B/STEP 532, based on the information recognized via communication from the support server 4, the first arithmetic processing element 351 causes the output device 32 to display the plan detail image P6 shown in FIG. 29B.

The plan detail image P6 includes: a plan name display P61 displaying a plan name, an edit button P62 for editing plan information, a time display P63 displaying start scheduled time and end scheduled time of the plan, a locational-point display P64 displaying a meeting locational point and/or a destination locational point, a representative name display P65 displaying the name (nickname) of a representative, a plan comment display P66 displaying a comment (including image or position information) of the plan by the representative or the like, a participating-member-name display P67 displaying the name or nickname of the member(s) participating in the plan, a participation/non-participation button P68 for expressing participation/non-participation in the plan, and a plan talk button P69 linked to the talk image P4 (see FIG. 28C).

The first arithmetic processing element 351 recognizes, via communication, the information input in the later-described processes of STEP 536 to STEP 540 by the user or other member(s) and stored in the support server 4, thereby causing the plan detail image P6 to include, at least, the plan name display P61, the time display P63, the locational-point display P64, the representative name display P65, the plan comment display P66, and the participating-member-name display P67.

Based on the information recognized via communication from the support server 4, the first arithmetic processing element 351 displays the edit button P62 on the condition that the user has the authority to edit plan details. The authority of the user to edit the plan details can be set, for example, at appropriate timing such as at the point of group creation/editing or at the point of plan creation/editing. The authority to set the plan details may be given to all of the participants.

Based on the information recognized via communication from the support server 4, the first arithmetic processing element 351 displays the valid participation/non-participation button P68 on the condition that the member has not expressed participation/non-participation in the past (the participation/non-participation button P68 has not been pressed). If the member has expressed participation/non-participation in the past, the first arithmetic processing element 351 may disable or hide the participation/non-participation button P68 or may display a cancel button that cancels the expression of participation/non-participation instead of the participation/non-participation button P68. If the user is the representative of the plan, the first arithmetic processing element 351 may disable or hide the participation/non-participation button P68.

The first arithmetic processing element 351 may cause the locational-point display P64 to include a link for displaying a route from the meeting locational point to the destination locational point on a map or a link to a navigation screen of a route necessary to execute the plan, for example, from the current location to the meeting locational point or from the meeting locational point to the destination locational point.

In the state in which the plan detail image P6 is displayed by the output device 32, the first arithmetic processing element 351 determines what input mode is the input mode of the user detected via the input device 31 (FIG. 26B/STEP 534).

If the input mode of the user detected via the input device 31 is the mode that selects to edit the plan such as pressing of the edit button P62 (FIG. 26B/STEP 534 . . . "SELECT TO EDIT PLAN"), the first arithmetic processing element 351 proceeds to FIG. 26B/STEP 536.

If the input mode of the user detected via the input device 31 is the mode that expresses participation or non-participation in the plan such as pressing of the participation/non-participation button P68 (FIG. 26B/STEP 534 . . . "EXPRESS PARTICIPATION/NON-PARTICIPATION"), the first arithmetic processing element 351 transmits participation or non-participation information of the user to the support server 4 and then proceeds to FIG. 26B/STEP 532.

Instead of this, if the input mode of the user detected via the input device 31 is the mode that expresses participation or non-participation such as pressing of the participation/non-participation button P68 (FIG. 26B/STEP 534 . . . "EXPRESS PARTICIPATION/NON-PARTICIPATION"), the first arithmetic processing element 351 may require the user to input a comment, transmits the comment and participation or non-participation information of the user to the support server 4, and then proceed to FIG. 26B/STEP 534. The participation/non-participation information and the comment of the user transmitted to the support server 4 may be distributed to the information terminals 3 owned by the group members as a speech in the group talk of the user.

If the input mode of the user detected via the input device 31 is the mode that displays a talk image about the plan such as pressing of the plan talk button P69 (FIG. 26B/STEP 534 . . . "SELECT TO DISPLAY PLAN TALK"), the first arithmetic processing element 351 proceeds to FIG. 26B/STEP 524. In this case, the first arithmetic processing element 351 may cause the output device 32 to display an image for causing the user to select a talk among the plan participants or a talk by the group.

The first arithmetic processing element 351 compares the present time and date with the execution date of the plan. As a result, if the present is the execution date of the plan, the first arithmetic processing element 351 may cause the output device 32 to display a talk image among the plan participants together with a message that acknowledge the user that the talk image among the plan participants is displayed. If the present is not the execution date of the plan, the first arithmetic processing element 351 may cause the output device 32 to display the image of a group talk.

In FIG. 26B/STEP 536, the first arithmetic processing element 351 causes the output device 32 to display the plan creation image P7 shown in FIG. 29C.

The plan creation image P7 includes: a time designation box P71 for designating start scheduled time and end scheduled time, a project-name designation box P72 for designating a project name, a meeting-locational-point designation box P73 for designating a meeting locational point, a destination-locational-point designation box P74 for designating a destination, a comment designation box P75 for designating a comment of a representative, a picture upload link P76, a participant invitation display P77, and a plan creation button P78 for transmitting input information to the support server 4.

The meeting-locational-point designation box P73, the destination-locational-point designation box P74, the picture upload link P76, and the participant invitation display P77 may be omitted. If one or both of the meeting-locational-point designation box P73 and the destination-locational-point designation box P74 is omitted, one or both of a meeting locational point and a destination locational point may be selected by selecting a locational point(s) on a map of a route creation image or a locational-point setting image, which will be described later.

The participant invitation display P77 includes a display P77a to select participants, etc. for selecting a participant(s) or a group(s) to be invited, an invitation-comment designation box P77b for inputting a comment for invitation, and a display P77c to add participants, etc. for adding a participant(s) or a group(s) to be invited.

If a fact that plan creation has been carried out is detected via the input device 31, for example, the plan creation button P78 is pressed, the first arithmetic processing element 351 transmits the input information to the support server 4 and causes the output device 32 to display a route creation image including map information (FIG. 26B/STEP 538).

The first arithmetic processing element 351 searches for a recommended route(s) based on the meeting locational point and the destination locational point designated by the user and predetermined search conditions such as wide roads, and causes the output device 32 to display search results. The recommended route may be displayed so as to be changeable by input by the user. The first arithmetic processing element 351 may cause the output device 32 to display a plurality of recommended routes. The first arithmetic processing element 351 may cause the output device 32 to display an image for causing the user to designate the search conditions such as wide roads.

If the first arithmetic processing element 351 detects the fact that a route has been determined via the input device 31, for example, that a route determination button for determining the route has been pressed, the first arithmetic processing element 351 transmits the input information to the support server 4 and causes the output device 32 to display a locational-point setting image for setting a stopover locational point(s) on the route (FIG. 26B/STEP 540).

The first arithmetic processing element 351 may display, together with a map, the name(s) of a facility(ies) such as a park on the route read from map information or near the route. The first arithmetic processing element 351 may display, together with the map, some recommended locational points, which are recognized via communication from the support server 4, in advance in a noticeable form.

If the first arithmetic processing element 351 detects the fact that locational point setting has been carried out, for example, that a button for setting a locational point is pressed via the input device 31, the first arithmetic processing element 351 transmits the input information to the support server 4 and proceeds to FIG. 26B/STEP 528.

(Process to Display Timely Recognized Information Corresponding to Mode)

Subsequently, with reference to FIG. 30 to FIG. 31, a process to display timely recognized information corresponding to modes will be explained. This process is executed at every predetermined time.

Figure 30:
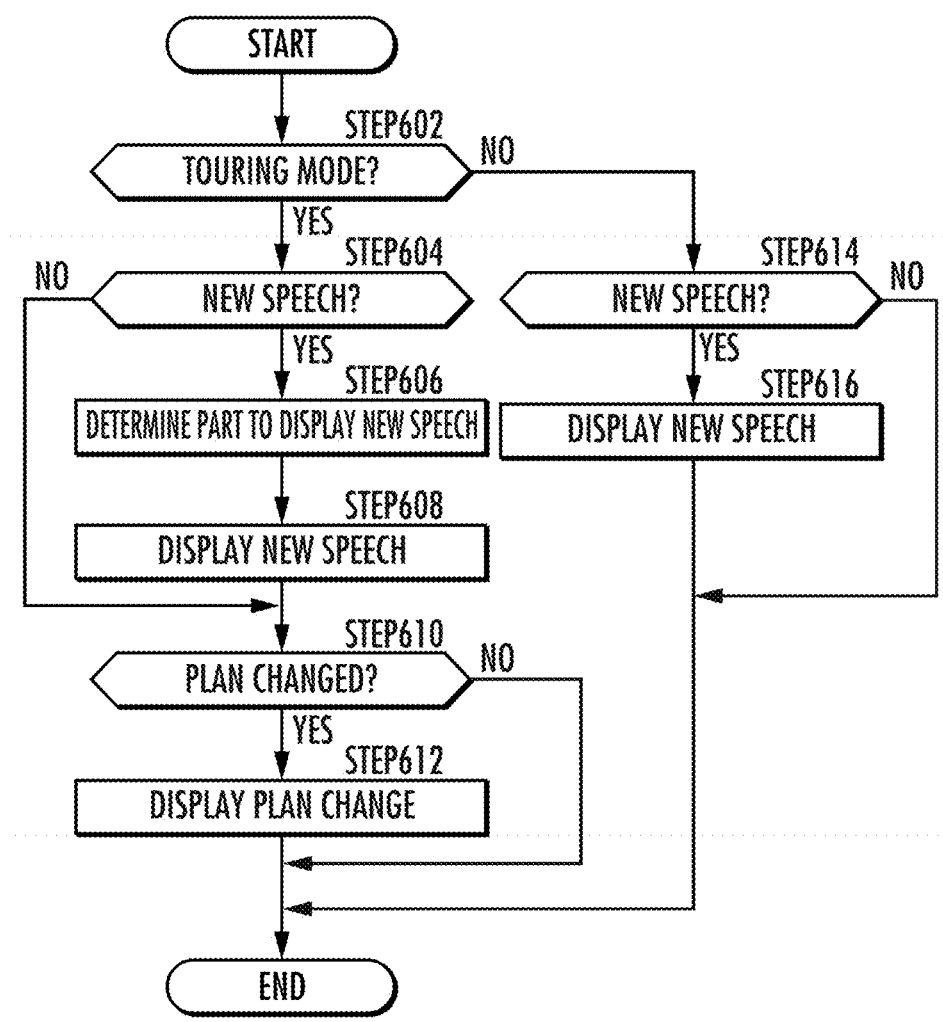
FIG. 30 is a flow chart explaining a display process corresponding to a mode.
Figure 31:
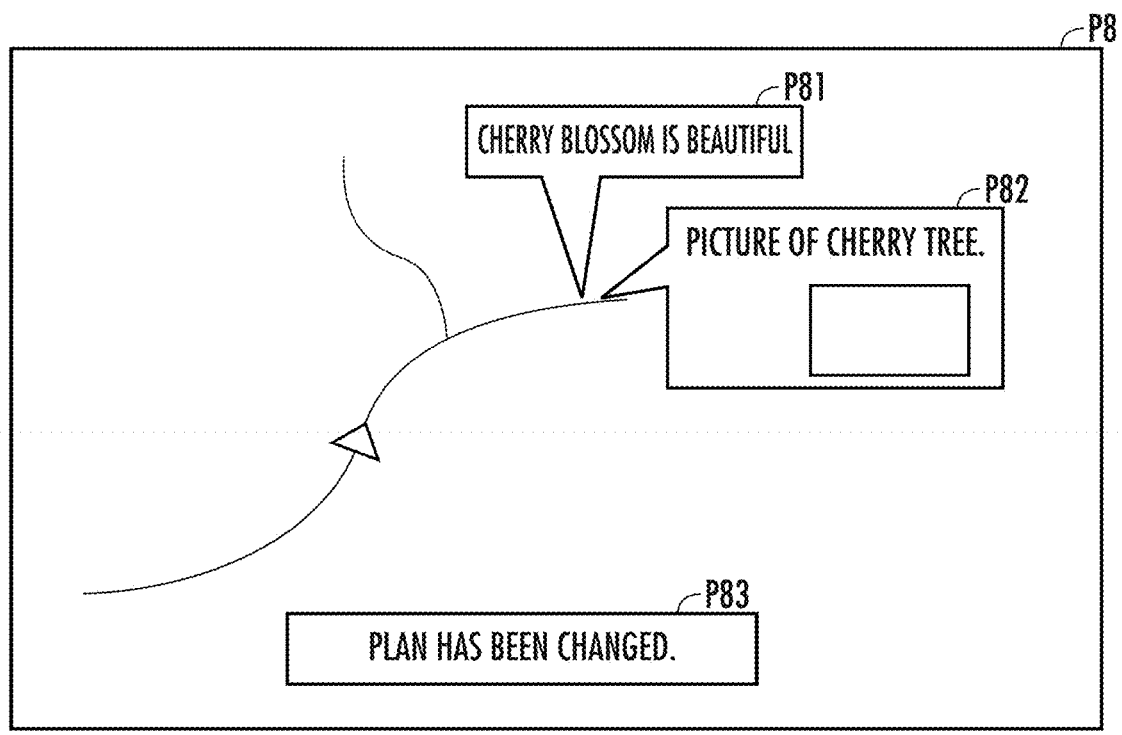
FIG. 31 is a drawing explaining a display process corresponding to a mode in a navigation image.

The second arithmetic processing element 352 determines whether or not the control mode is the touring mode (FIG. 30/STEP 602).

If the result of this determination is positive (FIG. 30/STEP 602 . . . YES), the second arithmetic processing element 352 determines whether or not there is a new speech by carrying out communication such as push communication with the support server 4 (FIG. 30/STEP 604).

If the result of this determination is positive (FIG. 30/STEP 604 . . . YES), the second arithmetic processing element 352 determines a display part of the new speech in a currently displayed image (FIG. 30/STEP 606).

For example, if there is a speech from another participant member in a state in which navigation is being carried out, as a display part of the new speech in the navigation image P8, the second arithmetic processing element 352 determines a part corresponding to the position of the speaker of the new speech as the display part of the speech. If there is an existing speech display P81, the second arithmetic processing element 352 may set a part that is not overlapped with the speech display as a display part of a new speech display P82 (see FIG. 31) or set a part that overwrites the speech as a display part of the new speech display P82.

The second arithmetic processing element 352 displays the new speech display P82 in the navigation image P8 in accordance with the determined display part (FIG. 30/STEP 608).

If the result of the determination of FIG. 30/STEP 604 is negative (FIG. 30/STEP 604 . . . NO) or after the process of FIG. 30/STEP 608, the second arithmetic processing element 352 determines whether or not there is a plan change(s) by communication such as push notification with the support server 4 (FIG. 30/STEP 610).

If the result of the determination of FIG. 30/STEP 610 is positive (FIG. 30/STEP 610 . . . YES), the second arithmetic processing element 352 causes the output device 32 to display a display P83 that the plan is changed (FIG. 30/STEP 612).

For example, if the second arithmetic processing element 352 determines that there is a plan change(s) in the state in which navigation is being carried out, the second arithmetic processing element 352 displays the display P83 that the plan is changed at a predetermined part on the navigation image P8.

If the result of the determination of FIG. 30/STEP 602 is negative (FIG. 30/STEP 602 . . . NO), the second arithmetic processing element 352 determines whether or not there is a new speech by carrying out communication such as push communication with the support server 4 (FIG. 30/STEP 614).

If the result of this determination is positive (FIG. 30/STEP 614 . . . YES), the second arithmetic processing element 352 displays the new speech at a predetermined part in the display screen of the output device 32 (FIG. 30/STEP 616).

If the result of the determination of FIG. 30/STEP 610 or FIG. 30/STEP 614 is negative (FIG. 30/STEP 610 . . . NO or FIG. 30/STEP 614 . . . NO) or after the process of FIG. 30/STEP 612 or FIG. 30/STEP 616, the second arithmetic processing element 352 terminates the speech displaying process during the navigation.

Effects of the Present Embodiment

According to the information terminal 3 of the present embodiment, the image that is not displayed among the plan detail image P6 (first information image) including the plan information (first information) and the talk image P4 (second information image) including the speech contents (second information) of the talk participant is displayed if the predetermined input mode is detected (see FIG. 26B/STEP 524, FIG. 26B/STEP 526 . . . "SELECT TO DISPLAY PLAN DETAIL IMAGE", and FIG. 26B/STEP 532; or FIG. 26B/STEP 532, FIG. 27/STEP 534 . . . "SELECT TO DISPLAY PLAN TALK", and FIG. 26B/STEP 524).

Therefore, when the user carries out appropriate input depending on a situation, the plan information (first information), which can be subjected to contents changes by at least some of the members of an assemblage and has low personal belongingness, and the speech contents (second information), which are sent from a member belonging to the assemblage, cannot be subjected to content changes except for the member, and have high personal belongingness, can be appropriately recognized.

As a result, information of the assemblage can be easily shared among the members belonging to the same assemblage.

Moreover, according to the information terminal 3 of this configuration, processing can be appropriately executed depending on the control mode.

Moreover, according to the information terminal of this configuration, in the state in the touring mode (first mode), the displays P81 and P82 of the speech contents (second information) are displayed by the output device 32 (image display device) even during navigation (FIG. 30/STEP 604 to FIG. 30/STEP 608); therefore, the user can timely recognize the information derived from the member of the assemblage. As a result, the information of the assemblage can be more easily shared among the members belonging to the same assemblage.

According to the information terminal 3 of this configuration, in the state in the touring mode (first mode), the display P83 (first information change notification) that the plan information is changed is displayed by the output device 32 (image display device) even during navigation (FIG. 30/STEP 610 to FIG. 30/STEP 612), the user can timely recognize the change of the plan information (first information). As a result, the information of the assemblage can be more timely shared among the members belonging to the same assemblage.

According to the information terminal of this configuration, in the state in which the control mode is the touring mode (first mode), the link for displaying the talk image P4 (second information image) that has a high probability of being interested by the user is displayed in the top image (FIG. 26A/STEP 510 and FIG. 26B/STEP 524). As a result, convenience for the user is improved.

(Modification Mode)

In the present embodiment, the plan information of an event such as touring is used as the "first information", and the speech contents of the talk participant are used as the "second information". However, instead of them, for example, a rule(s) of a certain group may be used as the first information, and an opinion content(s) with respect to the rule may be used as the second information. Moreover, instead of them, facts such as academic or local circumstances may be used as the first information, and an opinion content(s) with respect to them may be used as the second information.

REFERENCE SIGNS LIST

1 . . . SERVER, 2 . . . CLIENT, 10 . . . SERVER CONTROL DEVICE, 14 . . . DATABASE (SERVER STORAGE DEVICE), 20 . . . CLIENT CONTROL DEVICE, 21 . . . INPUT DEVICE, 22 . . . OUTPUT DEVICE, 24 . . . STORAGE DEVICE, 3 . . . INFORMATION TERMINAL, 31 . . . INPUT DEVICE, 32 . . . OUTPUT DEVICE, 35 . . . CONTROL DEVICE, 4 . . . SUPPORT SERVER, 40 . . . SERVER COMMUNICATION DEVICE, 41 . . . SUPPORT ARITHMETIC PROCESSING ELEMENT, P4 . . . TALK IMAGE (SECOND INFORMATION IMAGE), AND P6 . . . PLAN DETAIL IMAGE.

What is claimed is:

1. A server having a communication function with each of a plurality of clients serving as mobile stations, the server comprising:
   a server storage device that stores one or a plurality of belonging-target group(s) of respective users of the plurality of clients; and
   a server control device comprising at least one processor, and at least one memory including computer program code, wherein the at least one memory and the computer program code are configured, with the at least one processor, cause the server control device at least to,
      based on communication with a first client among the plurality of clients, recognize a plan about a first group to which the user of the first client belongs, the plan being determined by a departure place, a stopover, a destination, and a route from the departure place to the destination via the stopover; and,
      based on communication with a second client of a user among the plurality of clients, the user belonging to the first group as the belonging-target group stored by the server storage device, cause the second client to display predetermined information,
   wherein the plan includes an execution date of the plan,
   wherein when a present date and time is not the execution date of the plan, the at least one memory and the computer program code are configured, with the at least one processor, cause the server control device at least to send talk information by members of the belonging-target group to the first client and the second client,
   wherein when the present date and time is the execution date of the plan, the at least one memory and the computer program code are configured, with the at least one processor, cause the server control device at least to send the talk information by plan participants to a third client which is a client of a user participating in the plan among the plurality of clients,
   wherein the user participating in the plan is at least part of members of the first group, and
   wherein when the present time is before a starting time and date, a first-type talk information is sent to the third client, causing the third client to display a first-type screen including character keys, while when the present time is after the starting time and date, a second-type talk information is sent to the third client, causing the third client to display a second-type screen including model phrase buttons.

2. The server according to claim 1, wherein the predetermined information is a departure place icon, a stopover icon, and a destination icon respectively representing the departure place, the stopover, and the destination included in the plan and in the route.

3. The server according to claim 1, wherein, based on communication with the first client and the second client, the at least one memory and the computer program code are further configured, with the at least one processor, cause the server control device at least to
   recognize a message exchanged between the users of the first client and the second client; and,
   based on communication with the first client and the second client, cause each of the first client and the second client to display the message.

4. A client comprising:
   an input device that detects an input mode of a user;
   an output device that includes an image display device that displays an image;
   a communication device that carries out communication; and
   a client control device configured to
      recognize first information and second information by communicating with a first server via the communication device, the first information that can be subjected to content change by at least part of members of an assemblage formed by the plurality of members including the user, the second information that is sent by the individual member belonging to the assemblage via the respective client and cannot be subjected to content change except by the member who sent the second information; and,
      in a state that one image of a first information image including the first information and a second information image including the second information is displayed by the image display device, cause the image display device to display the other image of the first information image and the second information image on a condition that a predetermined input mode is detected by the input device,
   wherein the first server has a communication function with each of a plurality of clients serving as mobile stations, the first server comprising:
      a server storage device that stores one or a plurality of belonging-target group(s) of respective users of the plurality of clients; and
      a server control device; wherein,
      based on communication with a first client among the plurality of clients, the server control device is configured to recognize a plan about a first group to which the user of the first client belongs, the plan being determined by a departure place, a stopover, a destination, and a route from the departure place to the destination via the stopover; and,
      based on communication with a second client of a user among the plurality of clients, the user belonging to the first group as the belonging-target group stored by the server storage device, the server control device is configured to cause the second client to display predetermined information,
   wherein when a control mode is a predetermined mode, the client control device is configured to cause the image display device to display the second information image according to a predetermined operation in a predetermined screen,
   wherein when the control mode is not the predetermined mode, the client control device is configured to cause the image display device to display an image for selecting an image to be displayed among a plurality of images including the first information image and the second information image according to the predetermined operation in the predetermined screen,
   wherein the plan includes an execution date of the plan,
   wherein when a present date and time is not the execution date of the plan, the client control device is configured to cause the first server to send talk information by members of the first group to the client and a second client,
   wherein when the present date and time is the execution date of the plan, the client control device is configured to cause the first server to send the talk information by plan participants to a third client which is a client of a user participating in the plan among a plurality of clients,
   wherein the user participating in the plan is at least part of members of the first group, and wherein when the present time is before a starting time and date, a first-type talk information is sent to the third client, causing the third client to display a first-type screen including character keys, while when the present time is after the starting time and date, a second-type talk information is sent to the third client, causing the third client to display a second-type screen including model phrase buttons.

5. The client according to claim 4, wherein
the client control device is configured to execute a process in accordance with one control mode among a plurality of control modes including a first mode and a second mode different from the first mode.

6. The client of claim 4, wherein, if a transmission request of either one information of the first information or the second information is received from the client, the server control device is configured to transmit a command to the client, the command causing the image display device to display an image including either of the one information and information for making a transition to the other information of the first information and the second information.

7. An information sharing system comprising:
the client of claim 4,
wherein if a transmission request of either one information of the first information or the second information is received from the client, the server control device of the first server is configured to transmit the one information to the client.

8. The server according to claim 1, wherein the at least one memory and the computer program code are further configured, with the at least one processor, cause the server control device at least to,
based on communication with the first client among the plurality of clients, recognize a current location of the first client and a request to share information about the current location in the first group to which the user of the first client belongs; and,
based on communication with the second client of the user belonging to the first group as the belonging-target group stored by the server storage device among the plurality of clients, cause the second client to display a map showing the current location of the first client.

9. The server according to claim 8, wherein, the at least one memory and the computer program code are further configured, with the at least one processor, cause the server control device at least to
based on communication with the second client, the output presence of the request sent from the first client and, on a condition that the request is accepted by the second client, causes the second client to display the map.

10. The server according to claim 8, wherein, the at least one memory and the computer program code are further configured, with the at least one processor, cause the server control device at least to
based on communication with the first client and the second client, recognize a message exchanged between the users of the first client and the second client; and,
based on communication with the first client and the second client, cause each of the first client and the second client to display the message.

11. A client serving as a mobile station having a function to communicate with a server, the client comprising:
an input device;
an output device; and
a client control device;
wherein, based on communication with the server, the client control device is configured to cause the server to recognize a plan about a first group to which a user of the client belongs, the plan including a departure place, a stopover, and a destination input via the input device and a route from the departure place to the destination via the stopover,
wherein based on communication with the server, the client control device is configured to cause the output device to display a departure place icon, a stopover icon, and a destination icon respectively representing a departure place, a stopover, and a destination and a route included in another plan sent from a client of another user belonging to the first group,
wherein the plan includes an execution date of the plan,
wherein when a present date and time is not the execution date of the plan, the client control device is configured to cause the server to send talk information by members of the first group to the client and a second client,
wherein when the present date and time is the execution date of the plan, the client control device is configured to cause the server to send the talk information by plan participants to a third client which is a client of a user participating in the plan among a plurality of clients,
wherein the user participating in the plan is at least part of members of the first group, and
wherein when the present time is before a starting time and date, a first-type talk information is sent to the third client, causing the third client to display a first-type screen including character keys, while when the present time is after the starting time and date, a second-type talk information is sent to the third client, causing the third client to display a second-type screen including model phrase buttons.

12. An information sharing system comprising the server of claim 1, wherein
the client serving as the mobile station having a function to communicate with the server, the client comprising:
an input device;
an output device; and
a client control device; wherein,
based on communication with the server, the client control device is configured to cause the server to recognize the plan about the first group to which the user of the client belongs, the plan including the departure place, the stopover, and the destination input via the input device and the route from the departure place to the destination via the stopover; and
based on communication with the server, the client control device is configured to cause the output device to display a departure place icon, a stopover icon, and a destination icon respectively representing a departure place, a stopover, and a destination and a route included in another plan sent from a client of another user belonging to the first group.

13. The client according to claim 11, wherein
based on communication with the server, the client control device is configured to cause the server to recognize a message sent via the input device from the user of the client to the another user belonging to the first group, and, meanwhile, the client control device is configured to recognize the message sent from the another user and then to cause the output device to display the message.

14. The client according to claim 11, wherein,
if an operation of a first designation mode is detected via the input device, based on communication with the server, the client control device is configured to cause the server to recognize a first current location of the client and a request to share information about the current location in the first group to which the user of the client belongs; and, based on communication with the server, the client control device is configured to recognize a second current location of a first client included in the request sent from the first client of a first user belonging to the same group as the user of the client and then to cause the output device to display a map showing the current location of the first client.

15. The client according to claim 14 wherein the client control device is configured to recognize a message input via the input device and then, based on communication with the server, to cause the server to recognize the request and the message; and, if an operation of a designation mode is detected via the input device in a state in which the map showing the current location of the first client is displayed by the output device, based on communication with the server, the client control device is configured to cause the output device to display the message input to the first client.

16. The client according to claim 14, wherein the client control device is configured to cause the output device to output presence of the request based on communication with the server; and, if an operation of a second designation mode via the input device is detected, based on communication with the server, the client control device is configured to recognize the current location of the first client included in the request and to cause the output device to display the map showing the current location of the first client.

* * * * *